United States Patent
Jang et al.

(10) Patent No.: US 12,328,159 B2
(45) Date of Patent: Jun. 10, 2025

(54) COMMUNICATION CONTROL DEVICE, AND METHOD FOR ESTABLISHING COMMUNICATION LINK BY USING SAME

(71) Applicant: Samsung Electronics Co., Ltd., Suwon-si (KR)

(72) Inventors: Changwon Jang, Suwon-si (KR); Seungjin Yu, Suwon-si (KR); Woong Lee, Suwon-si (KR); Yuseon Lee, Suwon-si (KR); Jaewoong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/164,852

(22) Filed: Feb. 6, 2023

(65) Prior Publication Data

US 2023/0179264 A1 Jun. 8, 2023

Related U.S. Application Data

(63) Continuation of application No. PCT/KR2021/009641, filed on Jul. 26, 2021.

(30) Foreign Application Priority Data

Aug. 10, 2020 (KR) ........................ 10-2020-0100124

(51) Int. Cl.
*H04B 7/0408* (2017.01)
*G01S 13/42* (2006.01)
*H04W 76/00* (2018.01)

(52) U.S. Cl.
CPC ............ *H04B 7/0408* (2013.01); *G01S 13/42* (2013.01); *H04W 76/00* (2013.01)

(58) Field of Classification Search
CPC ...... H04B 7/04; H04B 7/0404; H04B 7/0408; H04B 7/0413; H04B 7/0491; H04B 7/08;
(Continued)

(56) References Cited

U.S. PATENT DOCUMENTS 6,191,734 B1 * 2/2001 Park ........................ H01Q 3/06
342/359
6,300,865 B1 * 10/2001 Fechner ............... G05D 1/0257
340/436
(Continued)

FOREIGN PATENT DOCUMENTS

CN  101341771 A  1/2009
CN  105744588 A  7/2016
(Continued)

OTHER PUBLICATIONS

European Search Report dated Dec. 1, 2023, issued in European Patent Application No. 21856092.8.
(Continued)

*Primary Examiner* — James M Perez
(74) *Attorney, Agent, or Firm* — Jefferson IP Law, LLP

(57) ABSTRACT

A method of establishing a communication link is provided. The method includes monitoring a heading direction of a vehicle, in case that the heading direction of the vehicle is changed by at least as much as a preset angle, determining a search order between a plurality of antenna modules in consideration of the changed heading direction of the vehicle and mounting positions of the plurality of antenna modules mounted on the vehicle, evaluating the plurality of antenna modules according to the search order, and communicating with a base station via a new antenna module selected based on a result of the evaluating, rather than via an old antenna module used for communication with the base station.

18 Claims, 17 Drawing Sheets

(58) Field of Classification Search
CPC .. H04B 7/0802; H04B 7/0805; H04B 7/0808; H04B 7/0814; H04B 7/0817; H04B 7/082; H04B 7/0822; H04B 7/0834; H04B 1/38; H04B 38/22; H04B 38/3827; H04B 38/06; H04B 38/08; H04B 38/082; G01S 13/00; G01S 13/02; G01S 13/06; G01S 13/42; G01S 13/46

See application file for complete search history.

(56) References Cited

U.S. PATENT DOCUMENTS

| | | | |
|---|---|---|---|
| 6,304,168 B1* | 10/2001 | Ohta | H01Q 1/3241 340/5.72 |
| 6,349,119 B1* | 2/2002 | Sogabe | H04B 17/391 375/316 |
| 6,897,804 B1* | 5/2005 | Hager | G01S 13/524 342/194 |
| 6,950,056 B2* | 9/2005 | Hager | G01C 21/005 342/63 |
| 7,684,802 B2 | 3/2010 | Jalali | |
| 9,306,639 B2* | 4/2016 | Burchard | H04B 7/026 |
| 9,843,375 B2* | 12/2017 | Kim | H04B 1/006 |
| 10,000,187 B2 | 6/2018 | Hamada et al. | |
| 10,481,243 B2* | 11/2019 | Alcalde | G01S 7/415 |
| 10,904,726 B2* | 1/2021 | Stirling-Gallacher | H04B 7/0404 |
| 10,910,703 B2* | 2/2021 | Kim | H01Q 1/42 |
| 10,925,030 B2 | 2/2021 | Han et al. | |
| 10,985,805 B2* | 4/2021 | Van Meurs | H04B 7/0413 |
| 11,032,718 B2* | 6/2021 | Malik | H04W 16/28 |
| 11,424,528 B2* | 8/2022 | Fang | H01Q 21/06 |
| 11,444,651 B2 | 9/2022 | Posselt et al. | |
| 11,528,586 B2* | 12/2022 | Tamanaha | G01S 5/0221 |
| 11,540,283 B2* | 12/2022 | Park | H04W 4/44 |
| 11,543,511 B2* | 1/2023 | Murata | G01S 13/68 |
| 11,733,375 B2* | 8/2023 | Kim | G01S 7/411 342/70 |
| 11,784,691 B2* | 10/2023 | Agrawal | H04B 7/0617 375/267 |
| 11,990,672 B2* | 5/2024 | Kim | H04B 7/0413 |
| 12,062,840 B2* | 8/2024 | Kim | H04B 7/0456 |
| 12,063,523 B2 | 8/2024 | Lin et al. | |
| 2003/0149512 A1* | 8/2003 | Hrovat | G01S 19/53 701/1 |
| 2003/0214431 A1* | 11/2003 | Hager | G01S 13/524 342/194 |
| 2010/0234071 A1* | 9/2010 | Shabtay | H04B 7/155 455/562.1 |
| 2014/0148093 A1* | 5/2014 | Nguyen | H04B 7/15507 455/11.1 |
| 2016/0025853 A1* | 1/2016 | Amano | G01S 7/0235 342/371 |
| 2016/0353467 A1 | 12/2016 | Nekovee | |
| 2016/0365909 A1* | 12/2016 | Kim | H04B 17/318 |
| 2017/0346156 A1* | 11/2017 | Morris | H01Q 1/1271 |
| 2018/0120414 A1* | 5/2018 | Alcalde | G01S 7/4004 |
| 2018/0219611 A1* | 8/2018 | Hudson | H04B 7/18504 |
| 2018/0227771 A1* | 8/2018 | Malik | H04W 4/24 |
| 2018/0339701 A1* | 11/2018 | Kwon | G05D 1/0257 |
| 2018/0366838 A1* | 12/2018 | Kim | H04W 4/40 |
| 2019/0212438 A1* | 7/2019 | Kim | G01S 13/867 |
| 2019/0387463 A1* | 12/2019 | Raghavan | H04B 7/0695 |
| 2020/0028544 A1* | 1/2020 | Bengtsson | H04B 7/088 |
| 2020/0037301 A1* | 1/2020 | Park | G05D 1/0088 |
| 2020/0076488 A1* | 3/2020 | Brunel | H04B 7/063 |
| 2020/0119775 A1* | 4/2020 | Park | G08G 1/096783 |
| 2020/0137537 A1* | 4/2020 | Tamanaha | H01Q 1/3233 |
| 2020/0137589 A1* | 4/2020 | Tamanaha | H04W 64/006 |
| 2020/0185819 A1* | 6/2020 | Kim | H01Q 1/3208 |
| 2020/0260440 A1* | 8/2020 | Yasukawa | H04L 1/08 |
| 2020/0280830 A1* | 9/2020 | Stirling-Gallacher | H04B 1/3822 |
| 2020/0313294 A1* | 10/2020 | Morita | H01Q 21/0025 |
| 2021/0021959 A1* | 1/2021 | MacNeille | H01Q 3/36 |
| 2021/0092575 A1* | 3/2021 | Stirling-Gallacher | H04B 1/40 |
| 2021/0119327 A1* | 4/2021 | Fang | H04B 1/3822 |
| 2021/0235285 A1* | 7/2021 | Guerena | H04W 16/28 |
| 2021/0305687 A1* | 9/2021 | Kim | H01Q 1/521 |
| 2021/0349181 A1* | 11/2021 | Nishikido | G01S 13/42 |
| 2021/0352576 A1* | 11/2021 | Selén | H04B 7/086 |
| 2022/0069450 A1* | 3/2022 | Kim | H04B 7/0413 |
| 2022/0329311 A1* | 10/2022 | Smits | H04L 67/12 |
| 2022/0386093 A1* | 12/2022 | Baek | H04W 56/00 |
| 2022/0390554 A1* | 12/2022 | Murakami | G01S 7/352 |
| 2023/0003876 A1* | 1/2023 | Homma | G01S 13/34 |
| 2023/0004171 A1* | 1/2023 | Bando | G01S 19/23 |
| 2023/0019268 A1* | 1/2023 | Sayama | H01Q 1/325 |
| 2023/0091904 A1* | 3/2023 | Xin | G01S 13/89 343/754 |
| 2023/0140472 A1* | 5/2023 | Lee | H01Q 1/3275 343/702 |
| 2023/0141292 A1* | 5/2023 | Han | G01S 17/88 342/372 |
| 2023/0176190 A1* | 6/2023 | Westerhoff | G01S 13/42 342/70 |
| 2023/0179264 A1* | 6/2023 | Jang | H04B 7/0695 375/262 |
| 2023/0198133 A1* | 6/2023 | Lewin | H01Q 3/34 343/713 |
| 2023/0353221 A1* | 11/2023 | Djordjevic | H04B 17/318 |
| 2024/0134035 A1* | 4/2024 | Gang | G01S 13/931 |
| 2024/0168152 A1* | 5/2024 | Sasaki | G01S 13/003 |
| 2024/0192350 A1* | 6/2024 | Khang | G01S 13/931 |

FOREIGN PATENT DOCUMENTS

| | | |
|---|---|---|
| CN | 106536840 A | 3/2017 |
| CN | 107408954 A | 11/2017 |
| CN | 109391310 A | 2/2019 |
| CN | 110199496 A | 9/2019 |
| CN | 110945796 A | 3/2020 |
| JP | 08116207 A | 5/1996 |
| JP | 2620350 B2 | 6/1997 |
| JP | 3227060 B2 | 11/2001 |
| JP | 2004-128927 A | 4/2004 |
| JP | 3943424 B2 | 7/2007 |
| JP | 2009-296132 A | 12/2009 |
| KR | 1728328 B1 | 4/2017 |
| KR | 10-2018-0008585 A | 1/2018 |
| WO | 2018/088051 A | 9/2019 |

OTHER PUBLICATIONS

QTM527 mmWave antenna module (=https://www.qualcomm.com/products/qtm527-mmwaveantenna-module).

International Search Report dated Nov. 1, 2021, issued in International Patent Application No. PCT/KR2021/009641.

Intention to Grant dated Sep. 9, 2024, issued in European Application No. 21 856 092.8-1206.

Extended European Search Report dated Apr. 2, 2025, issued in European Application No. 25152032.6-1206.

Indian Office Action dated Jan. 27, 2025, issued in Indian Application No. 202317015189.

Notice of Allowance (Decision to Grant) dated Apr. 28, 2025, issued in Chinese Application No. 202180055980.3.

\* cited by examiner

COMMUNICATION CONTROL DEVICE, AND METHOD FOR ESTABLISHING COMMUNICATION LINK BY USING SAME

CROSS-REFERENCE TO RELATED APPLICATION(S)

This application is a continuation application, claiming priority under § 365 (c), of an International application No. PCT/KR2021/009641, filed on Jul. 26, 2021, which is based on and claims the benefit of a Korean patent application number 10-2020-0100124, filed on Aug. 10, 2020, in the Korean Intellectual Property Office, the disclosure of which is incorporated by reference herein in its entirety.

BACKGROUND

1. Field

The disclosure relates to automotive electronics. More particularly, the disclosure relates to a communication control device for establishing a communication link of a vehicle.

2. Description of Related Art

Connected cars refer to cars that are connected to networks and provide various services. Connected cars are one of various concepts with respect to future cars, such as self-driving cars and smart cars.

In early stages, connected cars aimed at being connected to nearby networks or the Internet to provide services, such as starting of cars, diagnosis of cars, transmission and reception of calls/messages/e-mail, real-time traffic information, and emergency rescues. Due to the spread of the Internet of Things (IoT) that is recently receiving attention, connected cars are gradually advancing beyond early-stage telematics functions. Ultimate goals of present day connected cars are to realize self-driving simultaneously while providing various infotainment in the cars. Connected cars support vehicle-to-vehicle (V2V) communication and vehicle-to-everything communication, based on techniques represented by Vehicle-to-X (V2X). In addition, connected cars also provide safe self-driving or driving assistance functions or information about the cars themselves, traffic flow, and the like.

To achieve the ultimate goals of connected cars, the development of communication technology is necessarily required. There is a limit to satisfying the rapid increase in various mobile communication services, which are based on fifth generation (5G) mobile communication, only by using signals in existing 6 gigahertz (GHz) or lower bands and increasing communication capacity. In particular, the requirements of 5G mobile communication include high data transfer rates, very low delays, ability to process a large number of devices, high reliability, energy efficiency, and the like. To satisfy such requirements, studies on 5G radio access network (RAN) systems, to which millimeter wave (mmWave)-based new radio access techniques are applied, are being actively conducted.

Because the frequency band of millimeter waves ranges from 28 GHz to 100 GHz, the available continuous bandwidth thereof is greater than those of 6 GHz or lower bands. Millimeter-wave signals suffer from issues, such as path loss and non-line of sight (NLOS), due to high frequencies thereof. Therefore, in the 5G New Radio design, base stations (BSs) and user equipments (UEs) use narrow beams configured by beam adjustment. The greatest challenge to use of narrow beams is to establish and maintain communication links between BSs and UEs. To establish and maintain communication links, operations of periodically monitoring and searching for beams need to be performed, but such operations may cause issues of heat generation and power loss.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication control device and a method, performed by the communication control device, of establishing a communication link to stably maintain communication between a vehicle and a base station.

Aspects of the disclosure is to provide a communication control device and a method, performed by the communication control device, of establishing a communication link to reduce a load applied to the communication control device and minimize power consumption to establish and maintain the communication link.

Additional aspects will be set forth in part in the description which follows and, in part, will be apparent from the description, or may be learned by practice of the presented embodiments.

In accordance with an aspect of the disclosure, a method, performed by a communication control device, of establishing a communication link is provided. The method includes monitoring a heading direction of a vehicle, in case that the heading direction of the vehicle is changed by at least as much as a preset angle, determining a search order between a plurality of antenna modules by considering the changed heading direction of the vehicle and mounting positions of the plurality of antenna modules mounted on the vehicle, evaluating the plurality of antenna modules according to the search order, and communicating with a base station via a new antenna module selected based on a result of the evaluating, rather than via an old antenna module used for communication with the base station.

In accordance with an aspect of the disclosure, a communication control device. The device includes at least one processor, and a memory storing at least one instruction, wherein the at least one processor is configured to execute the at least one instruction to monitor a heading direction of a vehicle, in case that the heading direction of the vehicle is changed by at least a preset angle, determine a search order between a plurality of antenna modules by considering the changed heading direction of the vehicle and mounting positions of the plurality of antenna modules mounted on the vehicle, evaluate the plurality of antenna modules according to the search order, and communicate with the base station via a new antenna module selected based on a result of the evaluation, rather than via an old antenna module used for communication with the base station.

According to a communication control device and a method, performed by the communication control device, of establishing a communication link, according to an embodiment, communication between a vehicle and a base station may be stably maintained.

In addition, according to a communication control device and a method, performed by the communication control device, of establishing a communication link, according to an embodiment, in order to establish and maintain the communication link, a load applied to the communication control device may be reduced, and power consumption may be minimized.

However, effects achievable by a communication control device and a method, performed by the communication control device, of establishing a communication link, according to an embodiment, are not limited to those described above, and other advantageous effects not described will be clearly understood, by those of ordinary skill in the art, from the following descriptions.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
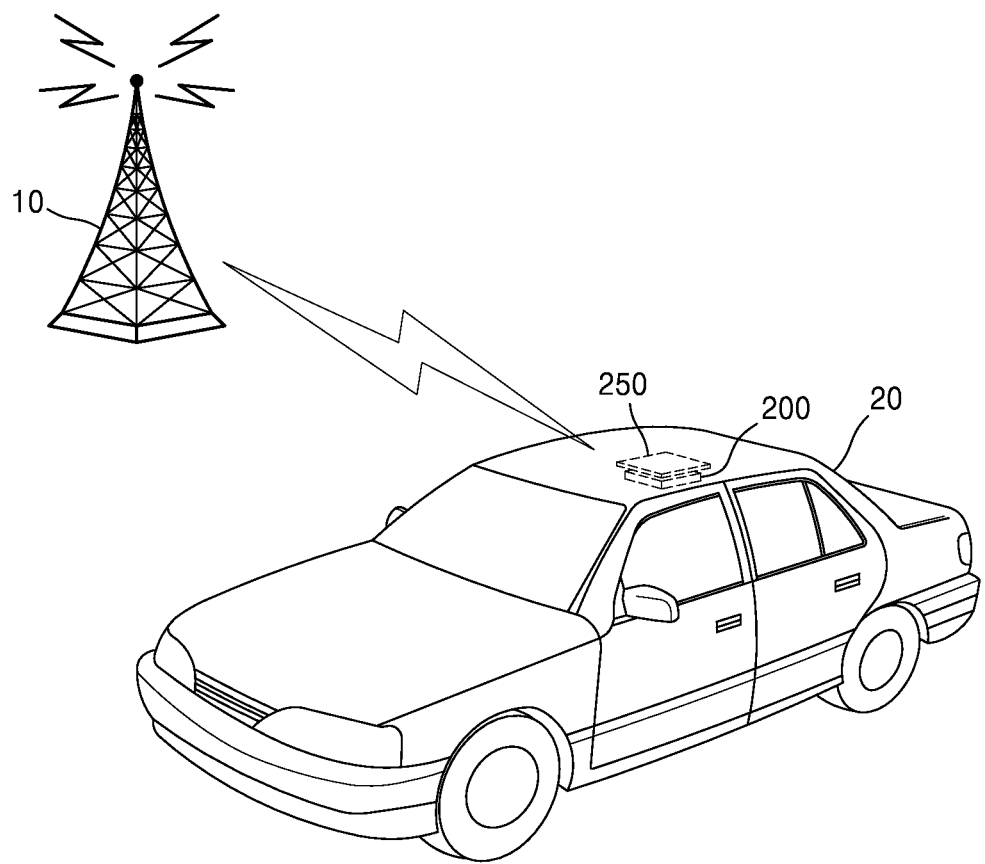
FIG. 1 is a diagram illustrating a vehicle and a base station according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to an embodiment, a method, performed by a communication control device, of establishing a communication link may include monitoring a heading direction of a vehicle, when the heading direction of the vehicle is changed by at least as much as a preset angle, determining a search order between a plurality of antenna modules by considering the changed heading direction of the vehicle and mounting positions of the plurality of antenna modules mounted on the vehicle, evaluating the plurality of antenna modules according to the search order, and communicating with a base station via a new antenna module selected based on a result of the evaluating, rather than via an old antenna module used for communication with the base station.

In an embodiment, the evaluating of the plurality of antenna modules may include comparing a quality index of a beam generated by each of the plurality of antenna modules with a quality index of a beam generated by the old antenna module.

In an embodiment, when a plurality of beams are generable by each of the plurality of antenna modules, the method of establishing the communication link may further include determining a search order between the plurality of beams by considering the changed heading direction of the vehicle and pointing directions of the plurality of beams, and the evaluating of the plurality of antenna modules may include comparing a quality index of each of the plurality of beams with a quality index of a beam generated by the old antenna module, according to the search order between the plurality of beams.

In an embodiment, when an array antenna of each of the plurality of antenna modules operates while divided into element groups, the method of establishing the communication link may further include determining a search order between the element groups by considering the changed heading direction of the vehicle and positions of the element groups in the array antenna, and the evaluating of the plurality of antenna modules may include comparing a quality index of a beam generated by each of the element groups with a quality index of a beam generated by the old antenna module, according to the search order between the element groups.

In an embodiment, the determining of the search order between the plurality of antenna modules may include, when the heading direction of the vehicle is changed in a clockwise direction, determining a search direction for the plurality of antenna modules to be a counterclockwise direction, and when the heading direction of the vehicle is changed in the counterclockwise direction, determining the search direction for the plurality of antenna modules to be the clockwise direction.

In an embodiment, the determining of the search order between the plurality of antenna modules may include selecting, as a first search object, an antenna module adjacent to the old antenna module from among the plurality of antenna modules.

In an embodiment, the determining of the search order between the plurality of antenna modules may include selecting a first search object from among the plurality of antenna modules by considering a location of the base station and a location of an obstacle around the vehicle.

In an embodiment, the heading direction of the vehicle may be checked from at least one of a rotation angle of a steering wheel, a navigation system, a global positioning system (GPS), or a gyro sensor of the vehicle.

In an embodiment, the determining of the search order between the plurality of antenna modules may include selecting some of the plurality of antenna modules by considering a location of the base station and mounting positions of the plurality of antenna modules mounted on the vehicle, and determining a search order between the selected antenna modules.

In an embodiment, the determining of the search order between the plurality of beams may include selecting some of the plurality of beams by considering a location of the base station and pointing directions of the plurality of beams, and determining a search order between the selected beams.

According to an embodiment, a communication control device may include at least one processor, and a memory storing at least one instruction, wherein the at least one processor may be configured to execute the at least one instruction to monitor a heading direction of a vehicle, when the heading direction of the vehicle is changed by at least as much as a preset angle, determine a search order between a plurality of antenna modules by considering the changed heading direction of the vehicle and mounting positions of the plurality of antenna modules mounted on the vehicle, evaluate the plurality of antenna modules according to the search order, and communicate with the base station via a new antenna module selected based on a result of the evaluation, rather than via an old antenna module used for communication with the base station.

In an embodiment, the processor may be further configured to execute the at least one instruction to, to evaluate the plurality of antenna modules, compare a quality index of a beam generated by each of the plurality of antenna modules with a quality index of a beam generated by the old antenna module.

In an embodiment, the processor may be further configured to execute the at least one instruction to select, as the new antenna module, an antenna module with a beam, which is identified earliest as being higher in quality index than the beam generated by the old antenna module, from among the plurality of antenna modules.

In an embodiment, the processor may be further configured to execute the at least one instruction to, when a plurality of beams are generable by each of the plurality of antenna modules, determine a search order between the plurality of beams by considering the changed heading direction of the vehicle and pointing directions of the plurality of beams; and, to evaluate the plurality of antenna modules, compare a quality index of each of the plurality of beams with the quality index of the beam generated by the old antenna module, according to the search order between the plurality of beams.

In an embodiment, the processor may be further configured to execute the at least one instruction to, when an array antenna of each of the plurality of antenna modules operates while divided into element groups, determine a search order between the element groups by considering the changed heading direction of the vehicle and positions of the element groups in the array antenna, and, to evaluate the plurality of antenna modules, compare a quality index of a beam generated by each of the element groups with the quality index of the beam generated by the old antenna module, according to the search order between the element groups.

The disclosure may undergo various changes and modifications and have various embodiments, and particular embodiments of the disclosure are illustrated in the accompanying drawings and will be described in detail in the following detailed description. However, it should be understood that the disclosure is not limited to particular embodiments, and that these particular embodiments encompass all changes, equivalents, and replacements falling within the spirit and scope of the disclosure.

In describing embodiments of the disclosure, a detailed description of publicly known art related thereto will be omitted when it may make the subject matter of the disclosure unclear. In addition, the numerals (e.g., first, second, and the like) used herein to describe embodiments are only identification symbols for distinguishing one component from other components.

It should be understood that, when one component is referred to as being "coupled to" or "connected to" another component, the one component may be directly coupled to or directly connected to the other component or may be coupled to or connected to the other component with an intervening component therebetween, unless otherwise stated.

In addition, herein, when a component is represented by the term such as " . . . unit", " . . . portion", " . . . module", or the like, two or more components may be integrated into one integrated component, or one component may be subdivided into two or more sub-components according to functionality. Furthermore, it is a matter of course that, regarding respective components described below, a component may additionally perform some or all of functions of another component, or some of main functions of the component may be wholly responsible for and performed by the other component.

Hereinafter, embodiments of the disclosure will be described in turn in detail.

FIG. 1 is a diagram illustrating a vehicle and a base station according to an embodiment of the disclosure.

An antenna module 250 and a communication control device 200, for communication with a base station 10, are mounted on a vehicle 20 according to an embodiment.

Referring to FIG. 1, the antenna module 250 and the communication control device 200 may be located under a roof panel of the vehicle 20. Depending upon implementation examples, at least one of the antenna module 250 and the communication control device 200 may be located on at least one of a bonnet panel, a door panel, a fender panel, a pillar panel, a bumper panel, or a trunk panel.

The communication control device 200 transmits data to and receives data from the base station 10 via the antenna module 250. The communication control device 200 may communicate with the base station 10 by using a signal in a millimeter wave band. The signal in the millimeter wave band may suffer from issues, such as path loss and non-line of sight (NLOS), due to high frequency characteristics thereof. Therefore, in an embodiment of the disclosure, a plurality of antenna modules 250 may be mounted on the vehicle 20, and the communication control device 200 may cause a communication link between the vehicle 20 and the base station 10 to be stably maintained by selecting an antenna module 250 to be used for communication with the base station 10 from among the plurality of antenna modules 250.

Figure 2:
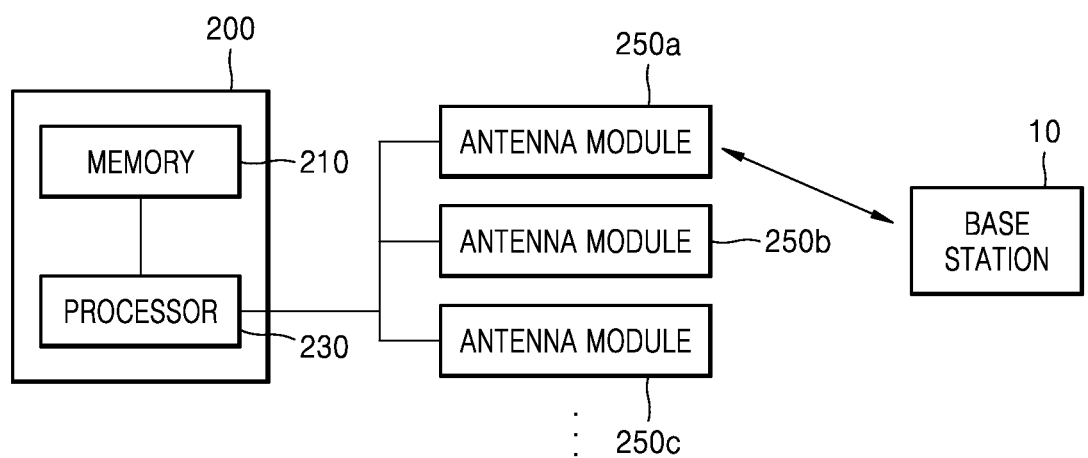
FIG. 2 is a diagram illustrating a communication control device and a plurality of antenna modules, which are mounted on a vehicle, according to an embodiment of the disclosure.

FIG. 2 is a diagram illustrating a communication control device and a plurality of antenna modules mounted on a vehicle, according to an embodiment of the disclosure.

Referring to FIG. 2, the communication control device 200 according to an embodiment selects an antenna module, which is to be used for communication with the base station 10, from among a plurality of antenna modules 250a, 250b, and 250c. As described below, while the communication control device 200 is communicating with the base station 10 by using one antenna module, when sensing a change in a heading direction of the vehicle 20 or the change of the base station 10, the communication control device 200 selects an antenna module, which may establish an optimum communication link, from among the plurality of antenna modules 250a, 250b, and 250c.

Hereinafter, an antenna module that is communicating with the base station 10 is referred to as an old antenna module, and an antenna module newly selected due to a reason, such as a change in the heading direction of the vehicle 20 or a base station change, is referred to as a new antenna module.

As shown in FIG. 2, the communication control device 200 includes a memory 210 and a processor 230. The memory 210 may store at least one instruction, and the processor 230 may execute the at least one instruction to perform a process of selecting a new antenna module, a process of selecting a best beam, or the like described below.

The memory 210 may store information used for the processor 230 to select a new antenna module or a best beam, such as information about mounting positions of the antenna modules 250a, 250b, and 250c or information about a pointing direction of a beam generated by each of the antenna modules 250a, 250b, and 250c.

The processor 230 may communicate with the base station 10 by using the new antenna module selected from the plurality of antenna modules 250a, 250b, and 250c. The processor 230 may select the new antenna module by considering the mounting positions of the plurality of antenna modules 250a, 250b, and 250c, the heading direction of the vehicle 20, and the like, and operation of the processor 230 are described below in detail.

Figure 3:
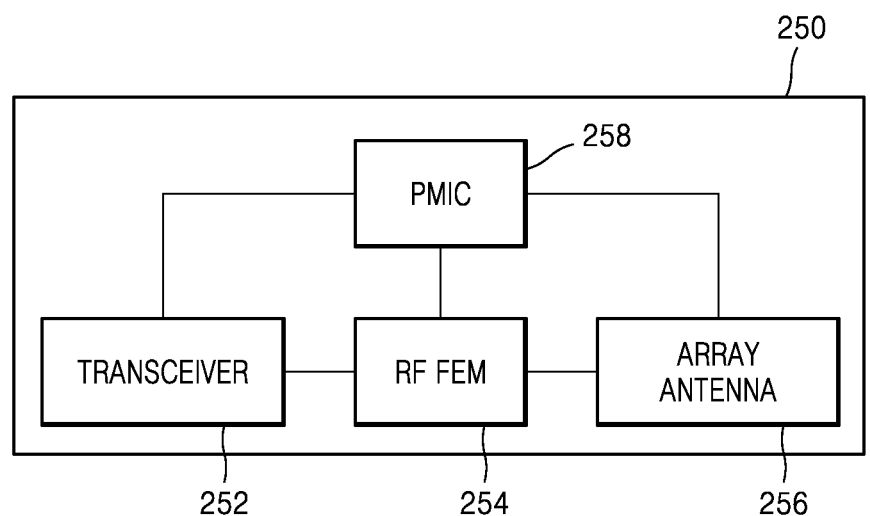
FIG. 3 is an example diagram illustrating a configuration of an antenna module according to an embodiment of the disclosure.

FIG. 3 is an example diagram illustrating a configuration of an antenna module mounted on a vehicle according to an embodiment of the disclosure.

Referring to FIG. 3, the antenna module 250 may include a transceiver 252, a radio frequency front-end module (RF FEM) 254, an array antenna 256, and a power management integrated circuit (PMIC) 258.

The transceiver 252 changes a data signal (e.g., a speech signal and the like), which comes out of a modem (e.g., the communication control device 200), into a signal with a transmittable frequency and changes a signal received from the base station 10 into a data signal, thereby relaying data between the base station 10 and the modem.

The RF FEM 254 may include a power amplifier, a low-noise amplifier, and the like. The RF FEM 254 may relay a frequency signal between the array antenna 256 and the transceiver 252 by increasing or reducing the amplitude of the frequency signal.

The array antenna 256 may include elements outputting radio wave signals (or frequency signals). By performing phase adjustment on the radio wave signals that are output from the elements, a beam with a specific direction may be output from the array antenna 256.

The PMIC 258 may transfer power, which is supplied from a battery, to the transceiver 252, the RF FEM 254, and the array antenna 256. The PMIC 258 may convert the power supplied from the battery into voltages and currents with magnitudes required by the transceiver 252, the RF FEM 254, and the array antenna 256.

The PMIC 258, the transceiver 252, and the RF FEM 254 shown in FIG. 3 may be respectively implemented by separate devices from each other. In some embodiments, the PMIC 258, the transceiver 252, and the RF FEM 254 may be implemented by one or more devices.

Figure 4:
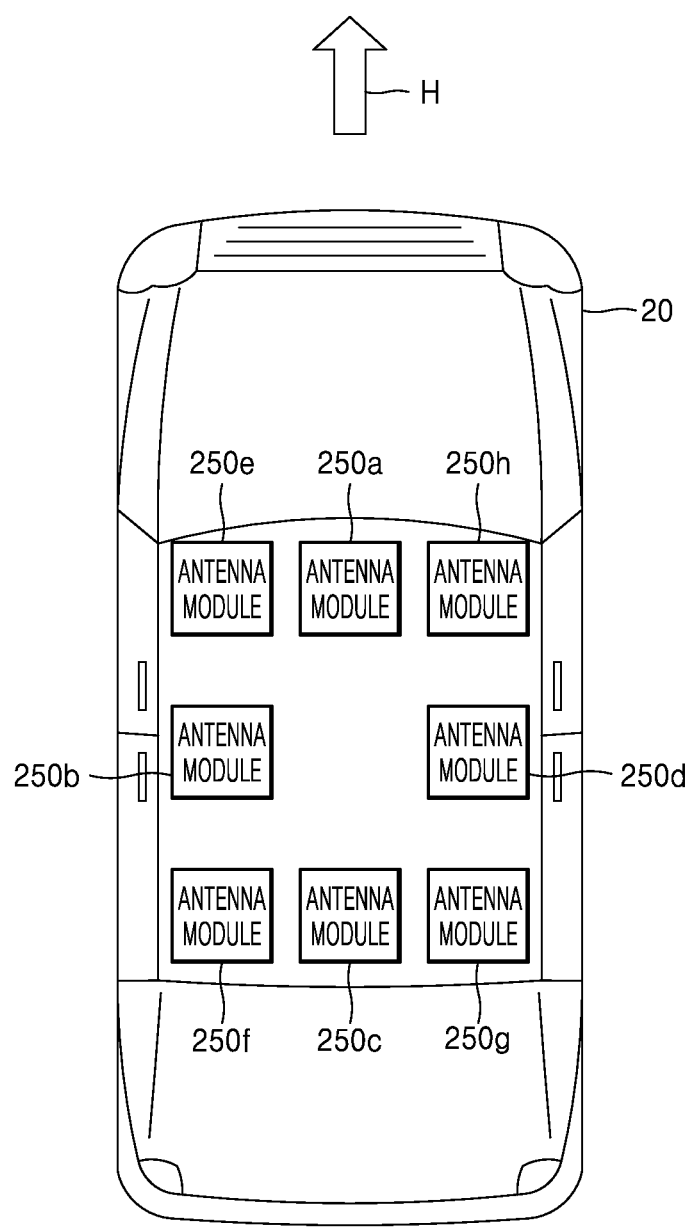
FIG. 4 is a diagram illustrating a vehicle on which a plurality of antenna modules are mounted according to an embodiment of the disclosure.

FIG. 4 is a diagram illustrating a vehicle on which a plurality of antenna modules are mounted according to an embodiment of the disclosure.

Referring to FIG. 4, according to an embodiment, the plurality of antenna modules 250a, 250b, 250c, 250d, 250e, 250f, 250g and 250h may be respectively mounted at different points in the vehicle 20. Although FIG. 4 illustrates that all the plurality of antenna modules 250a to 250h are mounted on a roof panel of the vehicle 20, this is only an example, and at least some of the plurality of antenna modules 250a to 250h may be mounted at various points other than the roof panel. In addition, the number of antenna modules 250a to 250h may be variously changed.

The communication control device 200 may select a new antenna module, which is to communicate with the base station 10, instead of an old antenna module by considering a heading direction H of the vehicle 20 and mounting positions of the plurality of antenna modules 250a to 250h.

The communication control device 200 may monitor the heading direction H of the vehicle 20.

For example, the communication control device 200 monitors the heading direction H of the vehicle 20, based on a rotation angle of a steering wheel of the vehicle 20. Specifically, the communication control device 200 may sense by what angle the steering wheel is rotated with respect to a reference position, in other words, a position causing the vehicle 20 to move straight.

As another example, the communication control device 200 monitors the heading direction H of the vehicle 20 via a GPS unit mounted on the vehicle 20.

As yet another example, the communication control device 200 monitors the heading direction H of the vehicle 20, based on a moving path of the vehicle 20, which is checked by a navigation system.

As yet another example, the communication control device 200 monitors the heading direction H of the vehicle 20 via a gyro sensor mounted on the vehicle 20.

When the heading direction H of the vehicle 20 is changed by as much as a preset angle or more, the communication control device 200 may determine that there is a need for a process of selecting a new antenna module, and may select the new antenna module, which is to replace an old antenna module, from among the plurality of antenna modules 250a to 250h.

To maintain a communication line with the base station 10, when a process of selecting an optimum antenna module and selecting an optimum beam is repeated, power consumption may be significantly increased, and there may be issues such as heat generation. Therefore, by considering the heading direction H of the vehicle 20 and the mounting positions of the plurality of antenna modules 250a to 250h, the communication control device 200 according to an embodiment may determine a search order between the plurality of antenna modules 250a to 250h and evaluates the plurality of antenna modules 250a to 250h one by one in the determined search order. In other words, by evaluating, first, an antenna module with high probability of being selected as the new antenna module, the communication control device 200 may quickly establish a communication line with the base station 10 without interruption of communication while minimizing power consumption.

In an embodiment, the communication control device 200 may determine the search order between the plurality of antenna modules 250a to 250h, based on in what direction the heading direction H of the vehicle 20 is changed and where the plurality of antenna modules 250a to 250h including the old antenna module are mounted. According to a change in the heading direction H of the vehicle 20 and the mounting positions of the plurality of antenna modules 250a to 250h, the search order corresponding thereto may be pre-stored.

To determine the search order between the plurality of antenna modules 250a to 250h, the communication control device 200, according to an embodiment, may determine a search direction for the plurality of antenna modules 250a to 250h and also determine an antenna module that corresponds to a first search object. When the first search object is determined, starting with the antenna module corresponding to the first search object, the remaining antenna modules may be sequentially evaluated according to the search direction.

For example, the communication control device 200 selects, as the first search object, an antenna adjacent to the old antenna module from among the plurality of antenna modules 250a to 250h. As another example, the communication control device 200 selects the first search object by considering a location of the base station 10 and a location of an obstacle around the vehicle 20. For example, when communication between the antenna module adjacent to the old antenna module and the base station 10 is anticipated to be blocked by the obstacle around the vehicle 20, the communication control device 200 selects, as the first search object, an antenna module that is not blocked by the obstacle around the vehicle 20.

To evaluate the antenna modules 250a to 250h, the communication control device 200 may compare a quality index of a beam generated by the old antenna module with a quality index of a beam generated by each of the antenna modules 250a to 250h. In a case in which a quality index of a beam of one antenna module evaluated according to the search order is greater than the quality index of the beam of the old antenna module, the communication control device 200 may select the one antenna module to be the new antenna module. When the quality index of the beam of each of the antenna modules 250a to 250h evaluated according to the search order is equal to or less than the quality index of the beam of the old antenna module, the communication control device 200 may continue to communicate with the base station 10 via the old antenna module.

The quality index may be one of a packet error rate (PER), quality of service (QOS), and resource information representing the amount of allocated resources, when communication with the base station 10 is performed by using a certain beam, or may be a value derived by a combination of at least one thereof.

Hereinafter, a process of selecting a new antenna module and a process of selecting a best beam will be described in detail with reference to FIGS. 5 to 12.

Figure 5:
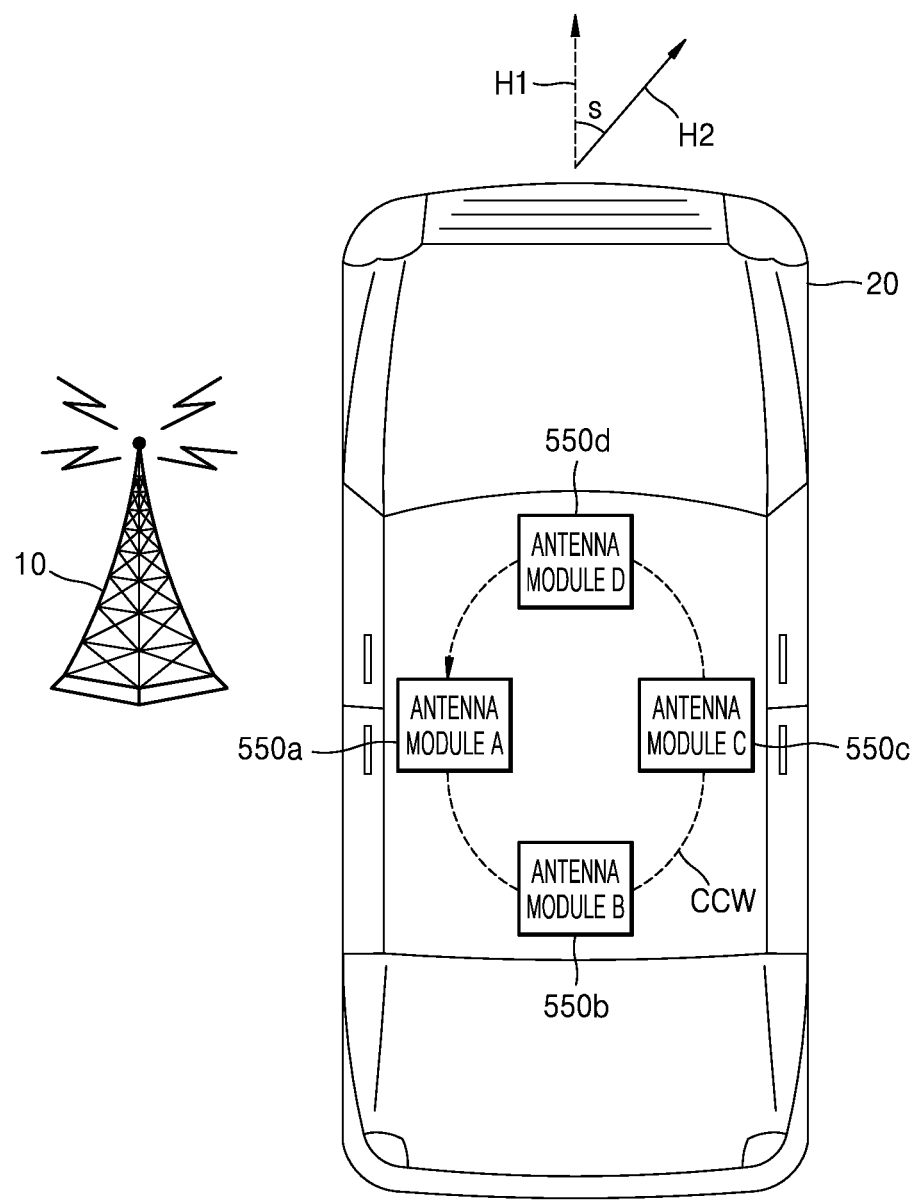
FIG. 5 is a diagram illustrating a method of determining a search order between antenna modules, according to an embodiment of the disclosure.

FIG. 5 is a diagram illustrating a method of determining a search order between antenna modules, according to an embodiment of the disclosure.

Referring to FIG. 5, four antenna modules 550a, 550b, 550c, and 550d are mounted on the vehicle 20, and the base station 10 is located on the left side of the vehicle 20. It is assumed that the antenna module 550a called A from among the four antenna modules 550a, 550b, 550c, and 550d is an old antenna module communicating with the base station 10.

In a case in which the heading direction of the vehicle 20 is changed from H1 to H2, the communication control device 200 determines whether an angle s between H1 and H2 is equal to or greater than a preset angle. In a case in which the angle s is equal to or greater than the preset angle, the communication control device 200 determines a search order between the four antenna modules 550a, 550b, 550c, and 550d by considering mounting positions of the four antenna modules 550a, 550b, 550c, and 550d and the changed heading direction, that is, H2.

For example, as shown in FIG. 5, when the heading direction of the vehicle 20 is changed from H1 to H2, that is, in a clockwise direction, the communication control device 200 determines a search direction for the four antenna modules 550a, 550b, 550c, and 550d to be a counterclockwise (CCW) direction. On the contrary, in a case in which the heading direction of the vehicle 20 is changed in the CCW direction, the communication control device 200 may determine the search direction for the four antenna modules 550a, 550b, 550c, and 550d to be a clockwise (CW) direction.

The reason of this is because, in a case in which the heading direction of the vehicle 20 is changed in the CW direction, the quality of a communication link between the base station 10 and an antenna module located in the CCW direction with respect to the old antenna module is anticipated to be excellent, and in a case in which the heading direction of the vehicle 20 is changed in the CCW direction, the quality of a communication link between the base station 10 and an antenna module located in the CW direction with respect to the old antenna module is anticipated to be excellent.

In a case in which the search direction is determined to be the CCW direction, the communication control device 200 may select, as a first search object, the antenna module 550*b* called B, which is closest in the CCW direction with respect to the old antenna module. In addition, the communication control device 200 may compare a quality index of a beam of the old antenna module with a quality index of a beam of each of the antenna modules 550*a*, 550*b*, 550*c*, and 550*d*, in the order of the antenna module 550*b* called B, the antenna module 550*c* called C, the antenna module 550*d* called D, and the antenna module 550*a* called A. While evaluating the antenna modules 550*a*, 550*b*, 550*c*, and 550*d* according to the search direction, the communication control device 200 may select, as a new antenna module, an antenna module with a beam that is identified earliest as being higher in quality index than the beam of the old antenna module. In a case in which the quality index of the beam of each of the antenna module 550*b* called B, the antenna module 550*c* called C, and the antenna module 550*d* called D is not greater than the quality index of the beam of the old antenna module, the communication control device 200 may communicate with the base station 10 by using the old antenna module, that is, the antenna module 550*a* called A.

Although FIG. 5 illustrates an example in which the base station 10 is on the left side of the vehicle 20, even when the base station 10 is on the right side of the vehicle 20, the communication control device 200 may select the new antenna module in the same manner. Specifically, in a case in which the heading direction of the vehicle 20 is changed in the CW direction, the communication control device 200 may determine the search direction for the antenna modules 550*a*, 550*b*, 550*c*, and 550*d* to be the CCW direction, and in a case in which the heading direction of the vehicle 20 is changed in the CCW direction, the communication control device 200 may determine the search direction for the antenna modules 550*a*, 550*b*, 550*c*, and 550*d* to be the CW direction.

Figure 6:
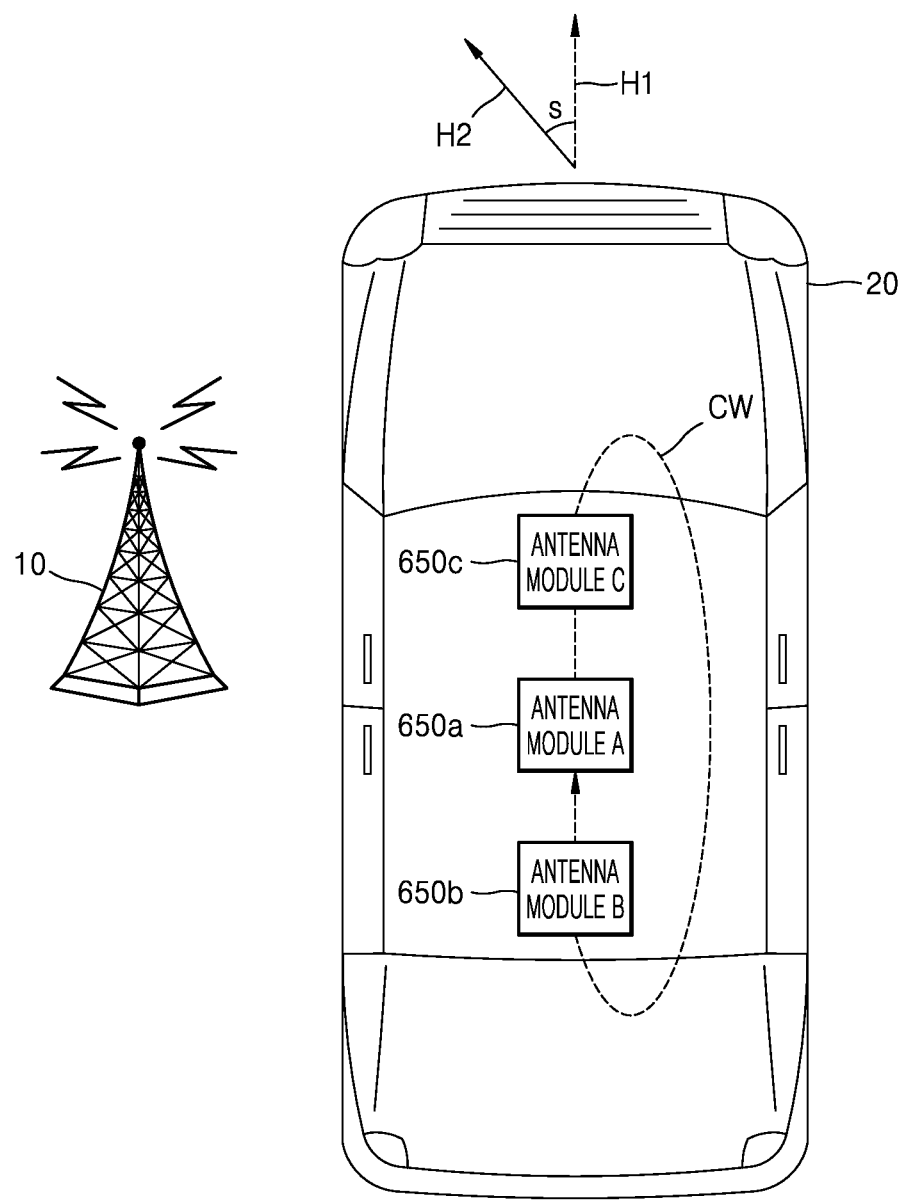
FIG. 6 is a diagram illustrating a method of determining a search order between antenna modules, according to an embodiment of the disclosure.

FIG. 6 is a diagram illustrating a method of determining a search order between antenna modules, according to an embodiment of the disclosure.

Referring to FIG. 6, three antenna modules 650*a*, 650*b*, and 650*c* are mounted on the vehicle 20, and the base station 10 is located on the left side of the vehicle 20. It is assumed that the antenna module 650*a* called A from among the three antenna modules 650*a*, 650*b*, and 650*c* is an old antenna module communicating with the base station 10.

In a case in which the heading direction of the vehicle 20 is changed from H1 to H2, the communication control device 200 determines whether the angle s between H1 and H2 is equal to or greater than a preset angle. In a case in which the angle s is equal to or greater than the preset angle, the communication control device 200 determines a search order between the three antenna modules 650*a*, 650*b*, and 650*c* by considering mounting positions of the three antenna modules 650*a*, 650*b*, and 650*c* and the changed heading direction, that is, H2.

Referring to FIG. 6, in a case in which the heading direction of the vehicle 20 is changed from H1 to H2, that is, in the CCW direction, the communication control device 200 may determine a search direction for the antenna modules 650*a*, 650*b*, and 650*c* to be the CW direction. On the contrary, in a case in which the heading direction of the vehicle 20 is changed in the CW direction, the communication control device 200 may determine the search direction for the antenna modules 650*a*, 650*b*, and 650*c* to be the CCW direction. The reason of this is because, when the heading direction of the vehicle 20 is changed in the CCW direction, the quality of a communication link between the base station 10 and an antenna module located in the CW direction with respect to the old antenna module is anticipated to be excellent, and when the heading direction of the vehicle 20 is changed in the CW direction, the quality of a communication link between the base station 10 and an antenna module located in the CCW direction with respect to the old antenna module is anticipated to be excellent.

In a case in which the search direction is determined to be the CW direction, the communication control device 200 may select, as a first search object, the antenna module 650*c* called C, which is closest in the CW direction with respect to the old antenna module. In addition, the communication control device 200 may compare a quality index of a beam of the old antenna module with a quality index of a beam of each of the antenna modules 650*a*, 650*b*, and 650*c*, in the order of the antenna module 650*c* called C, the antenna module 650*b* called B, and the antenna module 650*a* called A. While evaluating the antenna modules 650*a*, 650*b*, and 650*c* according to the search order, the communication control device 200 may select, as a new antenna module, an antenna module with a beam that is identified earliest as being higher in quality index than the beam of the old antenna module.

Although FIG. 6 illustrates an example in which the base station 10 is on the left side of the vehicle 20, even when the base station 10 is on the right side of the vehicle 20, the new antenna module may be selected in the same manner.

Figure 7:
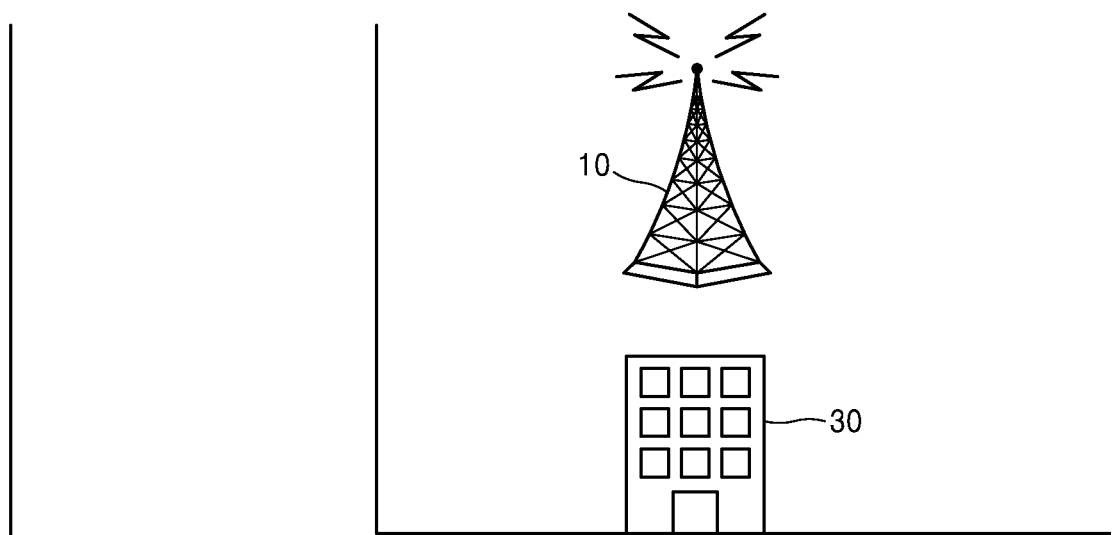
FIG. 7 is a diagram illustrating a method of determining a search order between antenna modules, according to an embodiment of the disclosure.
Figure 7:
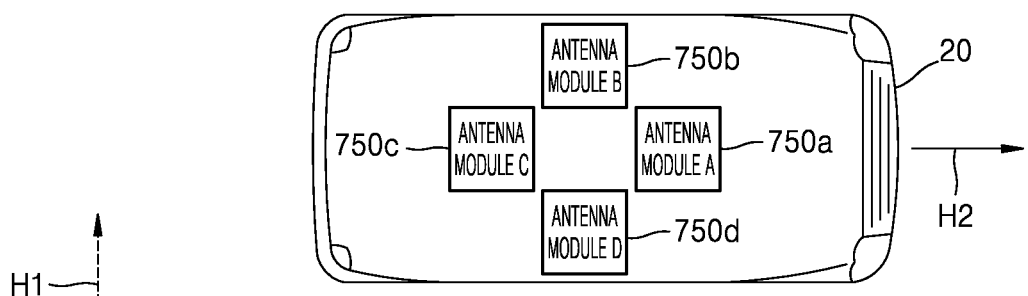
Figure 7:
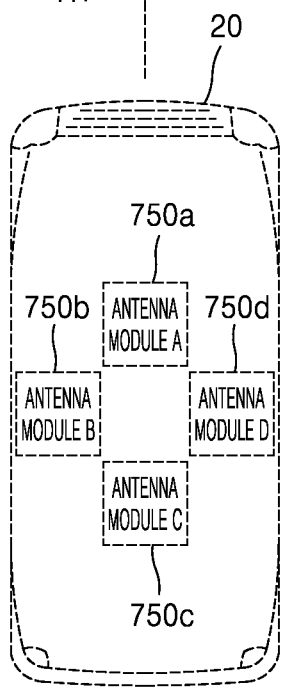

FIG. 7 is a diagram illustrating a method of determining a search order between antenna modules, according to an embodiment of the disclosure.

In a case in which determining a search order between a plurality of antenna modules 750*a*, 750*b*, 750*c*, and 750*d*, the communication control device 200 may determine the search order by considering the location of at least one of the base station 10 or a location of an obstacle 30 around the vehicle 20.

It is assumed that, while moving in a heading direction of H1, the vehicle 20 is communicating with the base station 10 via an antenna module 750*a* called A.

In a case in which the heading direction of the vehicle 20 is changed from H1 to H2, the communication control device 200 senses whether an angle between H1 and H2 is equal to or greater than a preset angle. In a case in which the angle between H1 and H2 is equal to or greater than the preset angle, the communication control device 200 determines the search order between the plurality of antenna modules 750*a*, 750*b*, 750*c*, and 750*d* for selecting a new antenna module.

As described with reference to FIGS. 5 and 6, when the heading direction of the vehicle 20 is changed from H1 to H2, that is, in the CW direction, the communication control device 200 may determine a search direction for the plurality of antenna modules 750*a*, 750*b*, 750*c*, and 750*d* to be the CCW direction and may select, as a first search object, the antenna module 750*b* called B, which is closest in the CCW direction with respect to the antenna module 750*a* called A. However, as shown in FIG. 7, when the obstacle 30 is located between the base station 10 and the antenna module 750*b* called B, there may be no need to evaluate the antenna module 750*b* called B. In other words, in a case in which the antenna module 750*b* called B is evaluated even though there is extremely low probability of being selected as the new antenna module due to the obstacle 30, there may be unnecessary power consumption. Therefore, the communication control device 200 according to an embodiment may determine the first search object by considering the location of the base station 10 and the location of the obstacle 30 around the vehicle 20.

Referring to FIG. 7, in a case in which the heading direction of the vehicle 20 is changed from H1 to H2, the base station 10 is located on the left side of the vehicle 20, and the communication control device 200 may identify that the obstacle 30 around the vehicle 20 is located on the left side of the vehicle 20. In a case in which it is identified that the obstacle 30 is between the base station 10 and the antenna module 750b called B, which is located in the CCW direction with respect to the antenna module 750a called A corresponding to the old antenna module, the communication control device 200 may select, as the first search object, the antenna module 750c called C, which is located in the CCW direction with respect to the antenna module 750b called B. In addition, while performing evaluation in the order of the antenna module 750c called C, the antenna module 750d called D, the antenna module 750a called A, and the antenna module 750b called B according to the search direction, the communication control device 200 may select the new antenna module.

The communication control device 200 may check the location of the base station 10 by various methods.

For example, the communication control device 200 identifies the location of the base station 10 by communication between the old antenna module and the base station 10. For example, the communication control device 200 pre-stores location information and identification information of base stations and may check the location of the base station 10 in communication from the identification information of the base station 10 communicating with the old antenna module.

As another example, the communication control device 200 receives the location information of the base station 10 from a nearby vehicle through communication with the nearby vehicle.

As yet another example, the communication control device 200 receives the location information of the base station 10 from an external apparatus, for example, a road side unit (RSU).

In an embodiment, the communication control device 200 may identify a location of an obstacle around the vehicle 20 by a sensor mounted on the vehicle 20. The sensor may include, but is not limited to, a radar sensor or the like. The obstacle sensed by the sensor may include a building, a tree, a fence, or a nearby vehicle.

In an embodiment, the communication control device 200 may determine a search order between the remaining antenna modules except for some of the plurality of antenna modules 750a, 750b, 750c, and 750d and may evaluate the antenna modules according to the determined search order. As shown in FIG. 7, in a case in which the base station 10 is located on the left side of the vehicle 20, the communication control device 200 may select an antenna module with low probability of being used to communicate with the base station 10, by considering mounting positions of the plurality of antenna modules 750a, 750b, 750c, and 750d. Specifically, because the antenna module 750d called D is farther away from the base station 10 than the other antenna modules 750a, 750b, and 750c, the communication control device 200 may determine a search order between the antenna module 750a called A, the antenna module 750b called B, and the antenna module 750c called C except for the antenna module 750d called D. In a case in which the heading direction of the vehicle 20 is changed in the CW direction, the communication control device 200 may determine the search order to be in order of the antenna module 750b called B, the antenna module 750c called C, and the antenna module 750a called A according to a CCW search direction. In a case in which it is inappropriate to select the antenna module 750b called B, as the first search object, due to the obstacle 30, the communication control device 200 may determine the search order to be the order of the antenna module 750c called C, the antenna module 750a called A, and the antenna module 750b called B.

In an embodiment, the communication control device 200 may select, as the first search object, an antenna module closest to the base station 10 from among the plurality of antenna modules 750a, 750b, 750c, and 750d and may evaluate the plurality of antenna modules 750a, 750b, 750c, and 750d according to a search direction determined from a change direction of the heading direction of the vehicle 20. As shown in FIG. 7, when the base station 10 is located on the left side of the vehicle 20, the communication control device 200 may select, as the first search object, the antenna module 750b called B, which is closest to the base station 10, from among the plurality of antenna modules 750a, 750b, 750c, and 750d, and when the heading direction of the vehicle 20 is changed in the CW direction, the communication control device 200 may determine the search direction to be the CCW direction. In a case in which an obstacle is located between the base station 10 and the antenna module closest to the base station 10, the communication control device 200 may select, as the first search object, an antenna module that is adjacent in the CW or CCW direction with respect to the antenna module closest to the base station 10.

In an embodiment, the communication control device 200 may determine the search order between the plurality of antenna modules 750a, 750b, 750c, and 750d to be a descending order of distances between the base station 10 and the plurality of antenna modules 750a, 750b, 750c, and 750d. For example, the antenna module 750b called B, which is closest to the base station 10, is selected to be a first search object, and the antenna module 750d called D, which is farthest from the base station 10, may be selected to be a last search object. In addition, in a case in which the antenna module 750a called A is closer to the base station 10 than the antenna module 750c called C is, the antenna module 750a called A may be selected to be a second search object, and the antenna module 750c called C may be selected to be a third search object.

Figure 8:
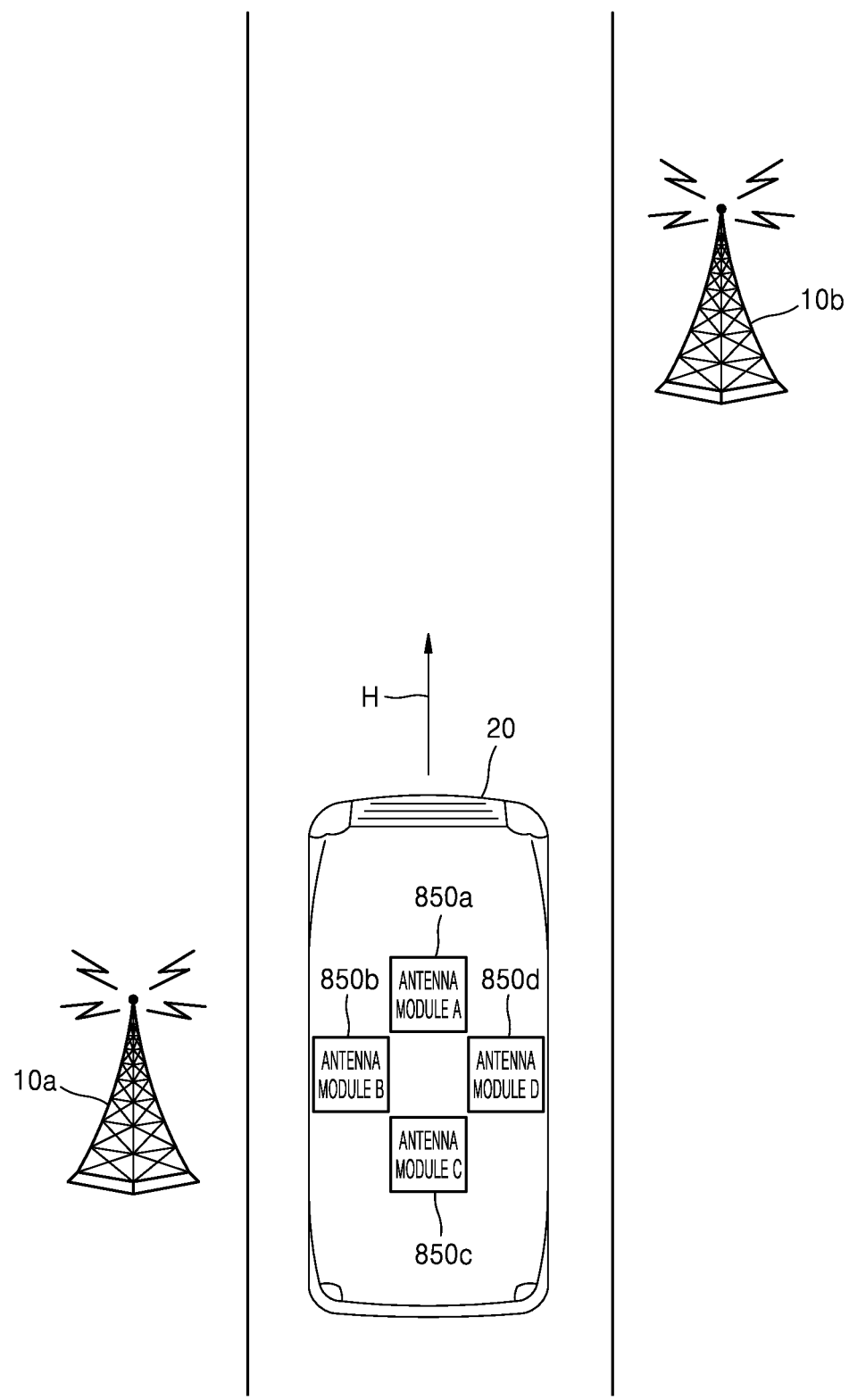
FIG. 8 is a diagram illustrating a method of selecting a new antenna module according to a base station change according to an embodiment of the disclosure.

FIG. 8 is a diagram illustrating a method of selecting a new antenna module according to a base station change according to an embodiment of the disclosure.

Although the communication control device 200 may select a new antenna module due to a change in the heading direction H of the vehicle 20, even in a case in which a change angle of the heading direction H of the vehicle 20 is not equal to or greater than a preset angle, as shown in FIG. 8, the communication control device 200 may select the new antenna module by evaluating a plurality of antenna modules 850a, 850b, 850c, and 850d in a case in which there is a need to change a base station.

The communication control device 200 may determine a search order between the antenna modules 850a, 850b, 850c, and 850d by considering a location of a base station to newly access and mounting positions of the antenna modules 850a, 850b, 850c, and 850d, and may select the new antenna module by evaluating the antenna modules 850a, 850b, 850c, and 850d according to the determined search order.

Referring to FIG. 8, it is assumed that the antenna module 850b called B is communicating with a first base station 10a.

While the vehicle 20 is moving in the heading direction H, the communication control device 200 may determine that it is needed to communicate with a second base station 10*b* instead of the first base station 10*a*. For example, in a case in which communication performance between the second base station 10*b* and the vehicle 20 is anticipated to be better than communication performance between the first base station 10*a* and the vehicle 20 along with the movement of the vehicle 20, the communication control device 200 determines to make a change from the first base station 10*a* to the second base station 10*b*.

Referring to FIG. 8, because the second base station 10*b* is located on the right side of the vehicle 20 along with the movement of the vehicle 20, the communication control device 200 may select, as a first search object, the antenna module 850*d* called D, which is located on the rightmost in the vehicle 20, and starting with the antenna module 850*d* called D, may evaluate the antenna module 850*a* called A, the antenna module 850*b* called B, and the antenna module 850*c* called C according to a preset search direction (e.g., the CW or CCW direction).

In an embodiment, the communication control device 200 may determine the search order between the plurality of antenna modules 850*a*, 850*b*, 850*c*, and 850*d* to be a descending order of distances between the second base station 10*b* and the plurality of antenna modules 850*a*, 850*b*, 850*c*, and 850*d*. For example, the antenna module 850*d* called D, which is closest to the second base station 10*b*, is selected to be a first search object, and the antenna module 850*b* called B, which is farthest from the second base station 10*b*, may be selected to be a last search object. In addition, in a case in which the antenna module 850*a* called A is closer to the second base station 10*b* than the antenna module 850*c* called C is, the antenna module 850*a* called A may be selected to be a second search object, and the antenna module 850*c* called C may be selected to be a third search object.

In an embodiment, because the second base station 10*b* is located on the right side of the vehicle 20, the communication control device 200 may determine a search order between the antenna module 850*a* called A, the antenna module 850*d* called D, and the antenna module 850*c* called C except for the antenna module 850*b* called B, which is farthest from the second base station 10*b*, from among the antenna modules 850*a*, 850*b*, 850*c*, and 850*d*. In addition, the communication control device 200 may determine the first search object and a search direction by considering a distance between the second base station 10*b* and each of the antenna module 850*a* called A, the antenna module 850*d* called D, and the antenna module 850*c* called C.

The array antenna 256 of the antenna module 250 shown in FIG. 3 may form beams with various pointing directions through the phase adjustment of radio wave signals that are output from elements therein. In a case in which a plurality of beams may be generated by the array antenna 256, in evaluating antenna modules 250, the communication control device 200 needs to evaluate the beams generable by the array antenna 256 of each of the antenna modules 250.

In a case in which a plurality of beams may be generated by the array antenna 256 of each of the plurality of antenna modules 250 mounted on the vehicle 20, the communication control device 200 may determine a search order between the plurality of beams. In addition, in a case in which evaluating one antenna module 250 according to the search order, the communication control device 200 may evaluate the beams generable by the one antenna module 250 according to the search order. The search order between the antenna modules 250 is referred to as a first search order, and the search order between the beams is referred to as a second search order.

For example, when the first search order is determined to be the order of an antenna module A and an antenna module B, the communication control device 200 compares a quality index of a beam, which is generated by an old antenna module, with quality indices of beams generable by the antenna module A, according to the second search order. The communication control device 200 may select, as a best beam, a beam identified earliest as being higher in quality index than the beam generated by the old antenna module, from among the beams generable by the antenna module A. In addition, the communication control device 200 may communicate with the base station 10 via the best beam of the antenna module A. In a case in which the quality index of each of the beams generable by the antenna module A is lower than the quality index of the beam generated by the old antenna module, the communication control device 200 evaluates the antenna module B according to the first search order.

In a case in which a plurality of beams may be generated by one antenna module 250, a method of determining the second search order between the beams is described with reference to FIG. 9.

Figure 9:
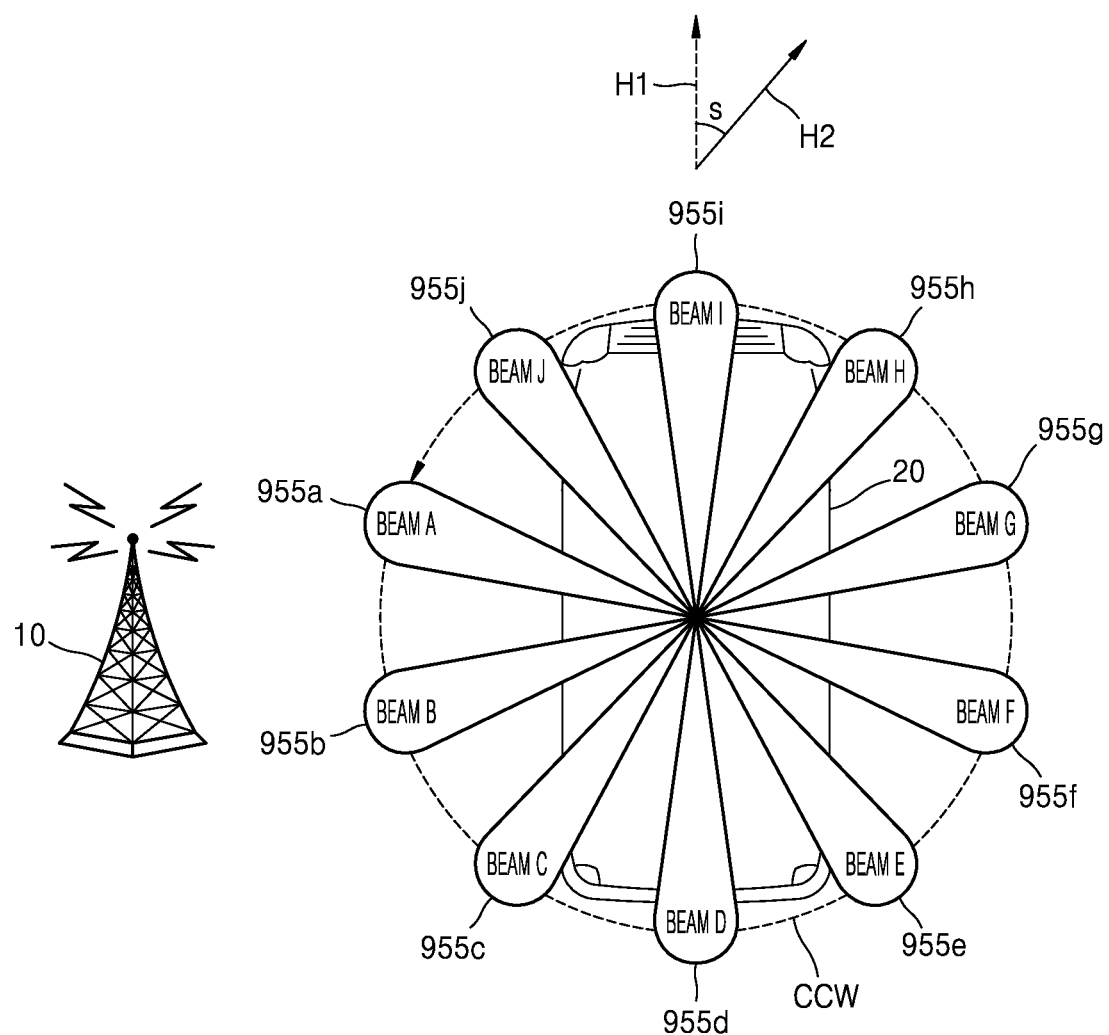
FIG. 9 is a diagram illustrating a method of determining a search order between a plurality of beams, according to an embodiment of the disclosure.

FIG. 9 is a diagram illustrating a method of determining the second search order between a plurality of beams, according to an embodiment of the disclosure.

Referring to FIG. 9, the base station 10 may be located on the left side of the vehicle 20, and ten beams 955*a*, 955*b*, 955*c*, 955*d*, 955*e*, 955*f*, 955*g*, 955*h*, 955*i* and 955*j* with different pointing directions from each other may be generated by one antenna module 250. It is assumed that the beam 955*a* called A from among the ten beams 955*a* to 955*j* is used for an old antenna module to communicate with the base station 10, and the beam 955*a* called A, which is used to communicate with the base station 10, is referred to as an old beam.

The communication control device 200 determines the second search order between the beams 955*a* to 955*j* by considering the heading direction of the vehicle 20 and the pointing directions of the beams 955*a* to 955*j*.

For example, as shown in FIG. 9, in a case in which the heading direction of the vehicle 20 is changed from H1 to H2, that is, in the CW direction, the communication control device 200 determines a search direction for the beams 955*a* to 955*j* to be the CCW direction. On the contrary, in a case in which the heading direction of the vehicle 20 is changed in the CCW direction, the communication control device 200 may determine the search direction for the beams 955*a* to 955*j* to be the CW direction.

The reason of this is because, in a case in which the heading direction of the vehicle 20 is changed in the CW direction, the quality of a communication link between the base station 10 and a beam located in the CCW direction with respect to the old beam is anticipated to be excellent, and in a case in which the heading direction of the vehicle 20 is changed in the CCW direction, the quality of a communication link between the base station 10 and a beam located in the CW direction with respect to the old beam is anticipated to be excellent.

In a case in which the search direction is determined to be the CCW direction, the communication control device 200 may select, as a first search object, the beam 955*b* called B, which is closest in the CCW direction with respect to the beam 955 called A. In addition, the communication control device 200 may compare a quality index of the beam of the old antenna module with a quality index of each of the beams 955a to 955j in the order of the beam 955b called B, the beam 955c called C, . . . , and the beam 955a called A. While evaluating the beams 955a to 955j according to the second search order, the communication control device 200 may select, as the best beam, a beam identified earliest as being higher in quality index than the beam of the old antenna module.

Although FIG. 9 illustrates an example in which the base station 10 is on the left side of the vehicle 20, even in a case in which the base station 10 is on the right side of the vehicle 20, the communication control device 200 may select the best beam in the same manner. Specifically, in a case in which the heading direction of the vehicle 20 is changed in the CW direction, the communication control device 200 may determine the search direction for the beams 955a to 955j to be the CCW direction, and in a case in which the heading direction of the vehicle 20 is changed in the CCW direction, the communication control device 200 may determine the search direction for the beams 955a to 955j to be the CW direction.

Figure 10:
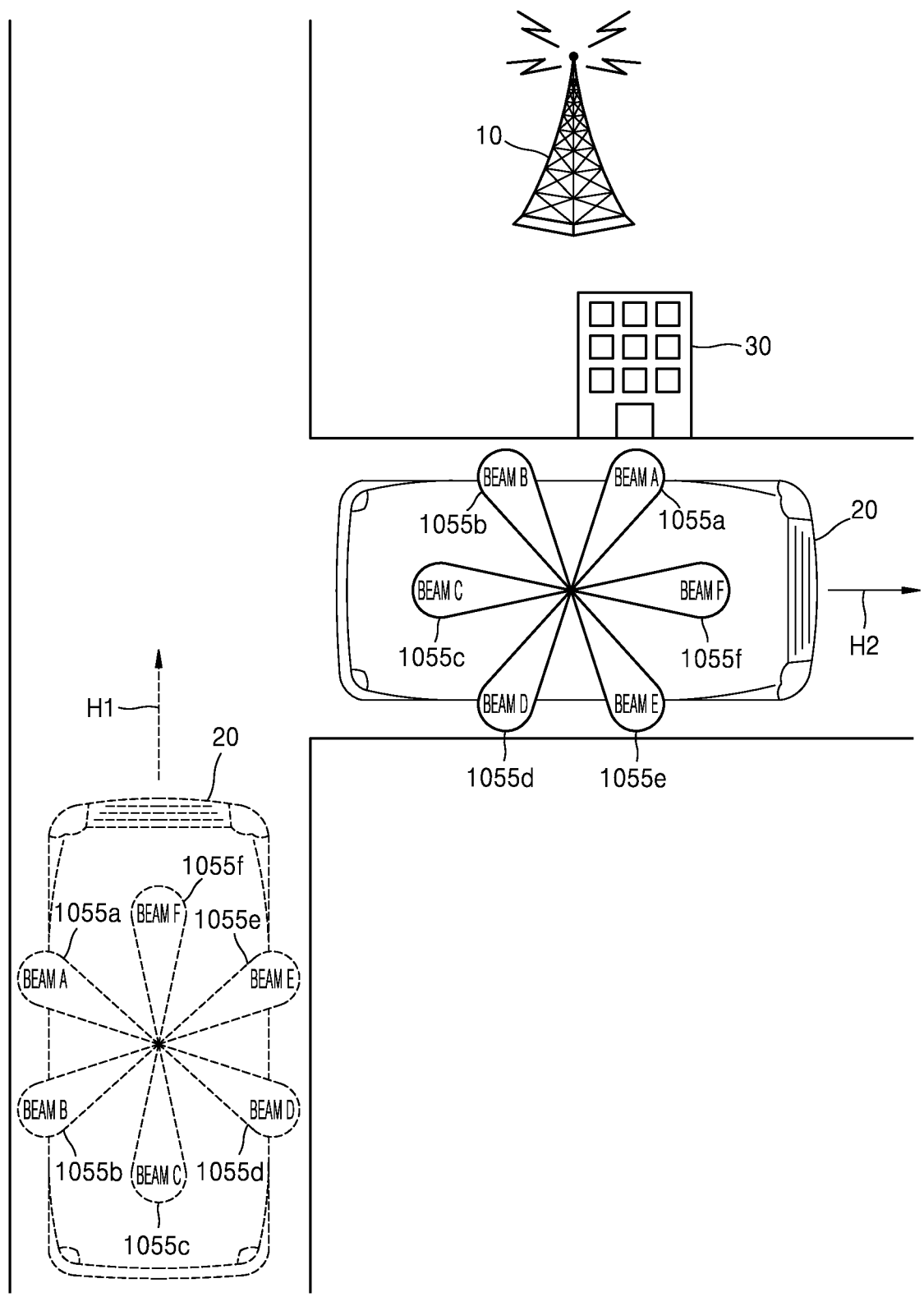
FIG. 10 is a diagram illustrating a method of determining a search order between a plurality of beams, according to an embodiment of the disclosure.

FIG. 10 is a diagram illustrating a method of determining the second search order between a plurality of beams, according to an embodiment of the disclosure.

Referring to FIG. 10, in an embodiment, in a case in which determining the second search order between a plurality of beams 1055a, 1055b, 1055c, 1055d, 1055e and 1055f generated by the antenna module 250, the communication control device 200 may consider the location of at least one of the base station 10 or the location of the obstacle 30 around the vehicle 20.

It is assumed that, while moving in a heading direction of H1, the vehicle 20 is communicating with the base station 10 via the beam 1055f called F (i.e., an old beam). In a case in which the heading direction of the vehicle 20 is changed from H1 to H2, the communication control device 200 may determine the first search order between a plurality of antenna modules for selecting a new antenna module and determines the second search order between the beams 1055a to 1055f.

The method of determining the first search order between the plurality of antenna modules has been described above, and thus, repeated descriptions thereof are omitted here.

In an embodiment, in a case in which the heading direction of the vehicle 20 is changed from H1 to H2, that is, in the CW direction, the communication control device 200 may determine a search direction for the beams 1055a to 1055f to be the CCW direction and may select, as a first search object, the beam 1055a called A, which is closest in the CCW direction with respect to the beam 1055f called F. As shown in FIG. 10, in a case in which the obstacle 30 is located between the base station 10 and a pointing direction of the beam 1055a called A, there may be no need to evaluate the beam 1055a called A. In other words, in a case in which the beam 1055a called A is evaluated despite extremely low probability that the beam 1055a called A will be selected as a best beam, there may be unnecessary power consumption. Therefore, the communication control device 200 according to an embodiment may determine the first search object by considering the location of the base station 10 and the location of the obstacle 30 around the vehicle 20.

Referring to FIG. 10, in a case in which the heading direction of the vehicle 20 is changed from H1 to H2, the base station 10 is located on the left side of the vehicle 20, and the communication control device 200 may identify that the obstacle 30 around the vehicle 20 is located on the left side of the vehicle 20. In a case in which it is identified that there is the obstacle 30 between the base station 10 and the beam 1055a called A, which is located in the CCW direction with respect to the beam 1055f called F, the communication control device 200 may select, as the first search object, the beam 1055b called B, which is located in the CCW direction with respect to the beam 1055a called A. In addition, while performing evaluation in the order of the beam 1055b called B, the beam 1055c called C, the beam 1055d called D, the beam 1055e called E, the beam 1055f called F, and the beam 1055a called A, the communication control device 200 may select the best beam.

In an embodiment, the communication control device 200 may determine the second search order between the remaining beams except for some of the plurality of beams 1055a to 1055f and may evaluate the remaining beams according to the second search order. As shown in FIG. 10, in a case in which the base station 10 is located on the left side of the vehicle 20, the communication control device 200 may select a beam with low probability of being used to communicate with the base station 10, by considering pointing directions of the plurality of beams 1055a to 1055f. Specifically, because the pointing directions of the beam 1055e called E and the beam 1055d called D are not directed toward the base station 10, the communication control device 200 may determine the second search order based on the beam 1055f called F, and the beam 1055a called A, the beam 1055b called B, and the beam 1055c called C except for the beam 1055e called E and the beam 1055d called D. In a case in which the heading direction of the vehicle 20 is changed in the CW direction, the communication control device 200 may determine the second search order to be the order of the beam 1055a called A, the beam 1055b called B, the beam 1055c called C, and the beam 1055f called F according to the CCW direction. In a case in which it is inappropriate to select, as the first search object, the beam 1055a called A due to the obstacle 30, the communication control device 200 may determine the second search order to be the order of the beam 1055b called B, the beam 1055c called C, the beam 1055f called F, and the beam 1055a called A.

Previously, it has been described with reference to FIG. 8 that, even though the change angle of the heading direction H of the vehicle 20 is equal to or less than the preset angle, in a case in which there is a need for a base station change, a process of selecting a new antenna module is performed. In this case, the second search order between a plurality of beams may be determined according to pointing directions of the plurality of beams, which may be generated by each antenna module, and the location of the second base station 10b. In addition, in a case in which evaluating one antenna module, the communication control device 200 may select the best beam by evaluating the beams generated by the one antenna module, according to the second search order. For example, a beam with a pointing direction, which is most similar to a direction where the second base station 10b is located, from among the plurality of beams is selected to be the first search object, and a search direction for the remaining beams may be determined to be the CW or CCW direction. As another example, a beam closest in the CW or CCW direction with respect to an old beam, which is used to communicate with the first base station 10a, is selected to be the first search object, and the search direction for the remaining beams may be determined to be the CW or CCW direction.

The array antenna 256 of the antenna module 250 shown in FIG. 3 may operate while divided into element groups, each representing a group of a certain number of elements.

Radio wave signals, which are respectively output from elements included in each element group, may form one beam. That is, in the instance where each of the array antennas 256 operates while divided into element groups, in a case in which evaluating the antenna modules 250, the communication control device 200 needs to evaluate beams respectively generated by the element groups of each array antenna 256.

In a case in which each of the array antennas 256 of the plurality of antenna modules 250 mounted on the vehicle 20 operates while divided into a plurality of element groups, the communication control device 200 may determine a search order between the plurality of element groups. Hereinafter, the search order between the plurality of element groups is referred to as a third search order.

In a case in which evaluating the plurality of antenna modules 250 according to the first search order, the communication control device 200 may evaluate element groups of the array antenna 256 of one antenna module 250 according to the third search order.

For example, in a case in which the first search order is determined to be the order of the antenna module A and the antenna module B, the communication control device 200 compares a quality index of a beam, which is generated by an old antenna module, with quality indices of beams, which are respectively generated by element groups of the antenna module A, according to the third search order. The communication control device 200 may select, as a best element group, an element group corresponding to a beam, which is identified earliest as being higher in quality index than the beam generated by the old antenna module, from among the beams respectively generated by the element groups of the antenna module A, and may communicate with the base station 10 via the beam of the selected element group. In a case in which the quality indices of the beams respectively generated by the element groups of the antenna module A are lower than the quality index of the beam generated by the old antenna module, the communication control device 200 evaluates the antenna module B according to the first search order.

In a case in which the array antenna 256 of one antenna module 250 operates while divided into a plurality of element groups, a method of determining the third search order between the element groups is described with reference to FIG. 11.

Figure 11:
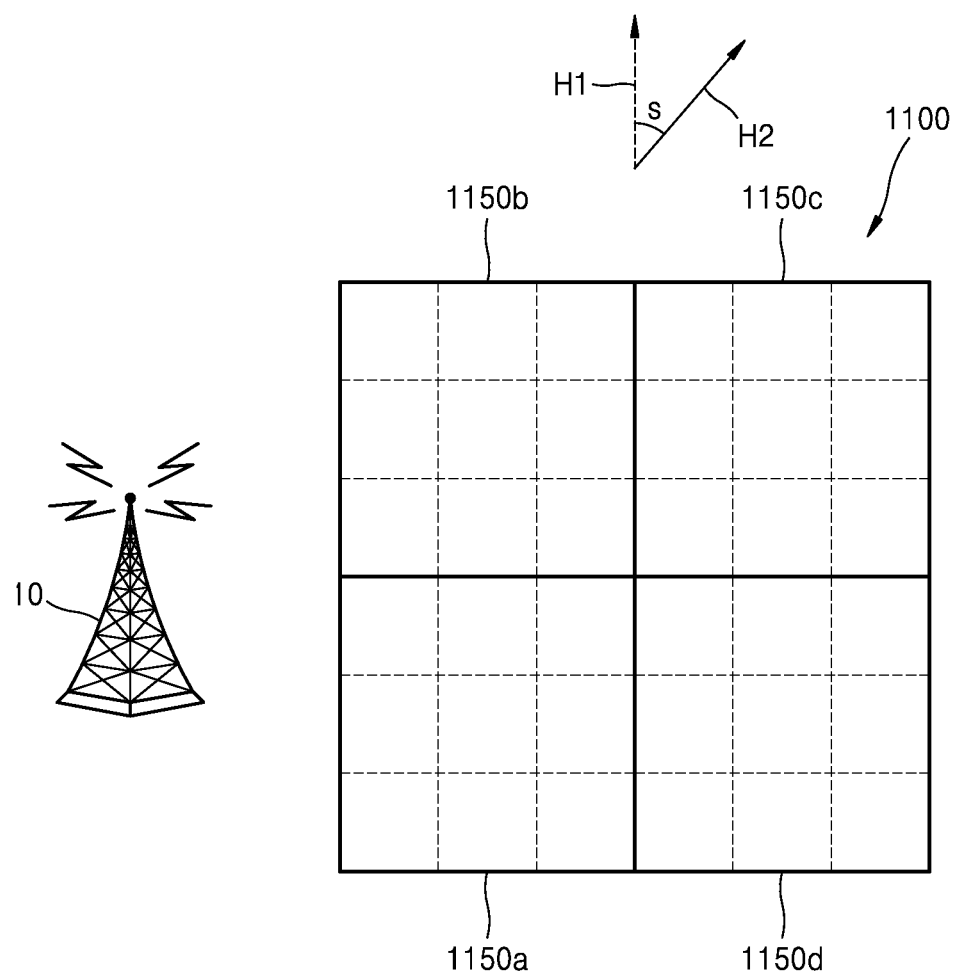
FIG. 11 is a diagram illustrating a method of determining a search order between element groups, according to an embodiment of the disclosure.

FIG. 11 is a diagram illustrating a method of determining the third search order between element groups, according to an embodiment of the disclosure.

Referring to FIG. 11, an array antenna 1100 may operate while divided into four element groups 1150a, 1150b, 1150c, and 1150d arranged at different positions from each other. It is assumed that the element group 1150a called A, from among the four element groups 1150a, 1150b, 1150c, and 1150d, is an old element group used to communicate with the base station 10.

The communication control device 200 determines the third search order between the four element groups 1150a, 1150b, 1150c, and 1150d by considering the heading direction of the vehicle 20 and the positions of the element groups 1150a, 1150b, 1150c, and 1150d on the array antenna 1100.

For example, as shown in FIG. 11, in a case in which the heading direction of the vehicle 20 is changed from H1 to H2, that is, in the CW direction, the communication control device 200 determines a search direction for the element groups 1150a, 1150b, 1150c, and 1150d to be the CCW direction. On the contrary, in a case in which the heading direction of the vehicle 20 is changed in the CCW direction, the communication control device 200 may determine the search direction for the element groups 1150a, 1150b, 1150c, and 1150d to be the CW direction.

In a case in which the search direction is determined to be the CCW direction, the communication control device 200 may select, as a first search object, the element group 1150b called B, which is closest in the CCW direction with respect to the element group 1150a called A. In addition, the communication control device 200 may compare a quality index of a beam of the old antenna module with a quality index of a beam of each of the element groups 1150a, 1150b, 1150c, and 1150d, in the order of the element group 1150b called B, the element group 1150c called C, the element group 1150d called D, and the element group 1150a called A. While evaluating the element groups 1150a, 1150b, 1150c, and 1150d according to the third search order, the communication control device 200 may select, as a best element group, an element group with a beam, which is identified earliest as being higher in quality index than the beam of the old antenna module.

Although FIG. 11 illustrates an example in which the base station 10 is on the left side of the vehicle 20, even in a case in which the base station 10 is on the right side of the vehicle 20, the communication control device 200 selects the best element group in the same manner. Specifically, in a case in which the heading direction of the vehicle 20 is changed in the CW direction, the communication control device 200 may determine the search direction for the element groups 1150a, 1150b, 1150c, and 1150d to be the CCW direction, and in a case in which the heading direction of the vehicle 20 is changed in the CCW direction, the communication control device 200 may determine the search direction for the element groups 1150a, 1150b, 1150c, and 1150d to be the CW direction.

Figure 12:
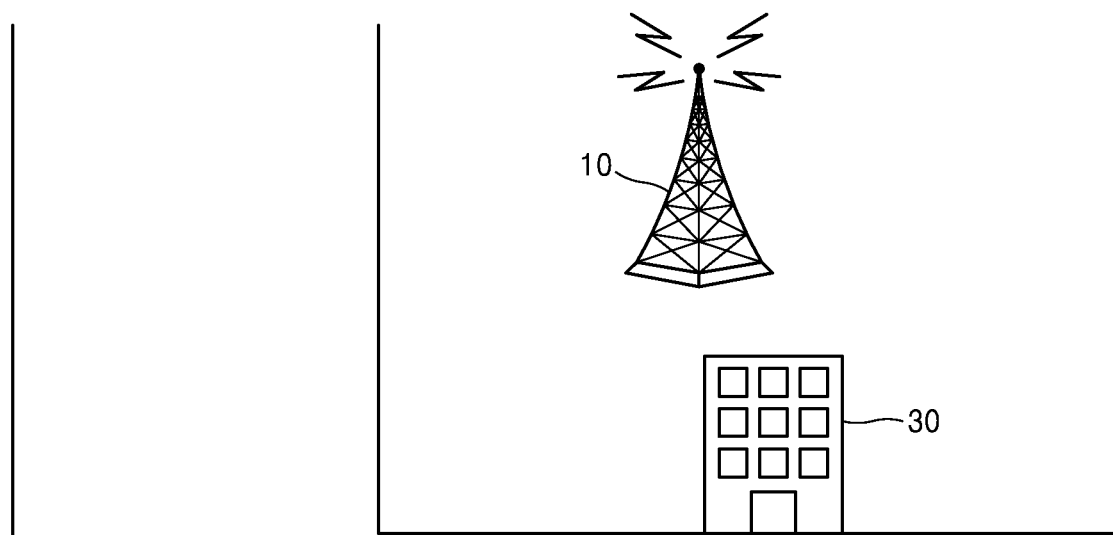
FIG. 12 is a diagram illustrating a method of determining a search order between element groups, according to an embodiment of the disclosure.
Figure 12:
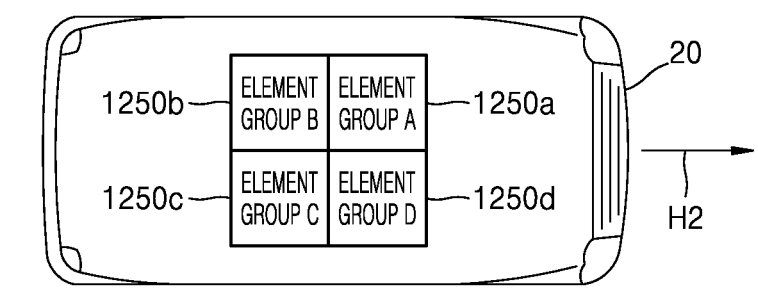
Figure 12:
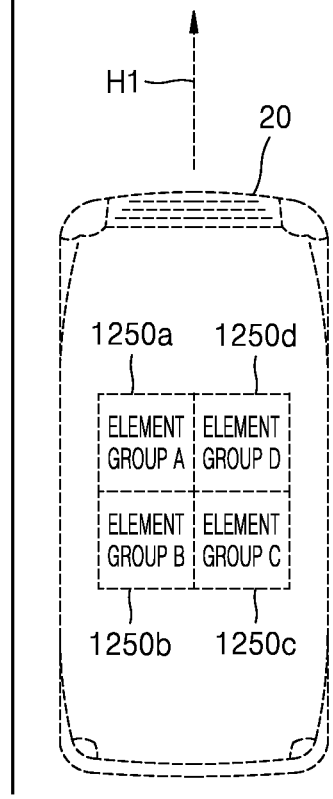

FIG. 12 is a diagram illustrating a method of determining the third search order between element groups, according to an embodiment of the disclosure.

Referring to FIG. 12, in an embodiment, in a case in which determining the third search order between element groups 1250a, 1250b, 1250c, and 1250d, the communication control device 200 may consider the location of the base station 10 and/or the location of the obstacle 30 around the vehicle 20.

It is assumed that, while moving in the heading direction of H1, the vehicle 20 is communicating with the base station 10 via the element group 1250d called D. In a case in which the heading direction of the vehicle 20 is changed from H1 to H2, the communication control device 200 determines the first search order between a plurality of antenna modules for selecting a new antenna module and determines the third search order between the element groups 1250a, 1250b, 1250c, and 1250d.

Because the method of determining the first search order between the plurality of antenna modules has been described above, repeated descriptions thereof are omitted here.

In a case in which the heading direction of the vehicle 20 is changed from H1 to H2, that is, in the CW direction, the communication control device 200 may determine a search direction for the element groups 1250a, 1250b, 1250c, and 1250d to be the CCW direction and may select, as a first search object, the element group 1250a called A, which is closest in the CCW direction with respect to the element group 1250d called D. However, as shown in FIG. 12, in a case in which the obstacle 30 is located between the base station 10 and the element group 1250a called A, there may be no need to evaluate the element group 1250a called A. In other words, in a case in which the element group 1250a called A is evaluated despite extremely low probability of being selected as a best element group, there may be unnecessary power consumption. Therefore, the communication control device 200 according to an embodiment may determine the first search object by considering the location of the base station 10 and the location of the obstacle 30 around the vehicle 20. Referring to FIG. 12, in a case in which the heading direction of the vehicle 20 is changed from H1 to H2, the base station 10 is located on the left side of the vehicle 20, and the communication control device 200 may identify that the obstacle 30 around the vehicle 20 is located on the left side of the vehicle 20. In a case in which it is identified that there is the obstacle 30 between the base station 10 and the element group 1250*a* called A, which is located in the CCW direction with respect to the element group 1250*d* called D, the communication control device 200 may select, as the first search object, the element group 1250*b* called B, which is located in the CCW direction with respect to the element group 1250*a* called A. In addition, while performing evaluation in the order of the element group 1250*b* called B, the element group 1250*c* called C, the element group 1250*d* called D, and the element group 1250*a* called A according to the search direction that is the CCW direction, the communication control device 200 may select a best element group.

In an embodiment, the communication control device 200 may determine the third search order between the remaining element groups except for some of a plurality of element groups 1250*a*, 1250*b*, 1250*c*, and 1250*d* and may evaluate the remaining element groups according to the third search order.

Referring to FIG. 12, in the instance where the element group 1250*d* called D is farthest from the base station 10 in a case in which the base station 10 is located on the left side of the vehicle 20, the communication control device 200 may determine the third search order based on the element group 1250*a* called A, the element group 1250*b* called B, and the element group 1250*c* called C except for the element group 1250*d* called D. In a case in which the heading direction of the vehicle 20 is changed in the CW direction, the communication control device 200 may determine the third search order to be the order of the element group 1250*a* called A, the element group 1250*b* called B, and the element group 1250*c* called C. In a case in which it is inappropriate to select the element group 1250*a* called A to be the first search object due to the obstacle 30, the communication control device 200 may determine the third search order to be the order of the element group 1250*b* called B, the element group 1250*c* called C, and the element group 1250*a* called A.

Previously, although it has been described with reference to FIG. 8 that a process of selecting a new antenna module is performed in the instance where there is a need to change a base station even when the change angle of the heading direction H of the vehicle 20 is equal to or less than the preset angle, in a case in which an array antenna of each antenna module operates while divided into a plurality of element groups, the third search order between the element groups may be determined according to positions of the plurality of element groups in the array antenna and the location of the second base station 10*b*. In addition, in a case in which evaluating one antenna module, the communication control device 200 may select a best element group by evaluating element groups of an array antenna of the one antenna module according to the third search order. For example, an element group, which is closest to the second base station 10*b*, from among a plurality of element groups is selected to be a first search object, and a search direction may be determined to be the CW or CCW direction. As another example, an element group, which is closest in the CW or CCW direction with respect to an old element group used to communicate with the first base station 10*a*, is selected to be a first search object, and a search direction for the remaining element groups may be determined to be the CW or CCW direction.

Figure 13:
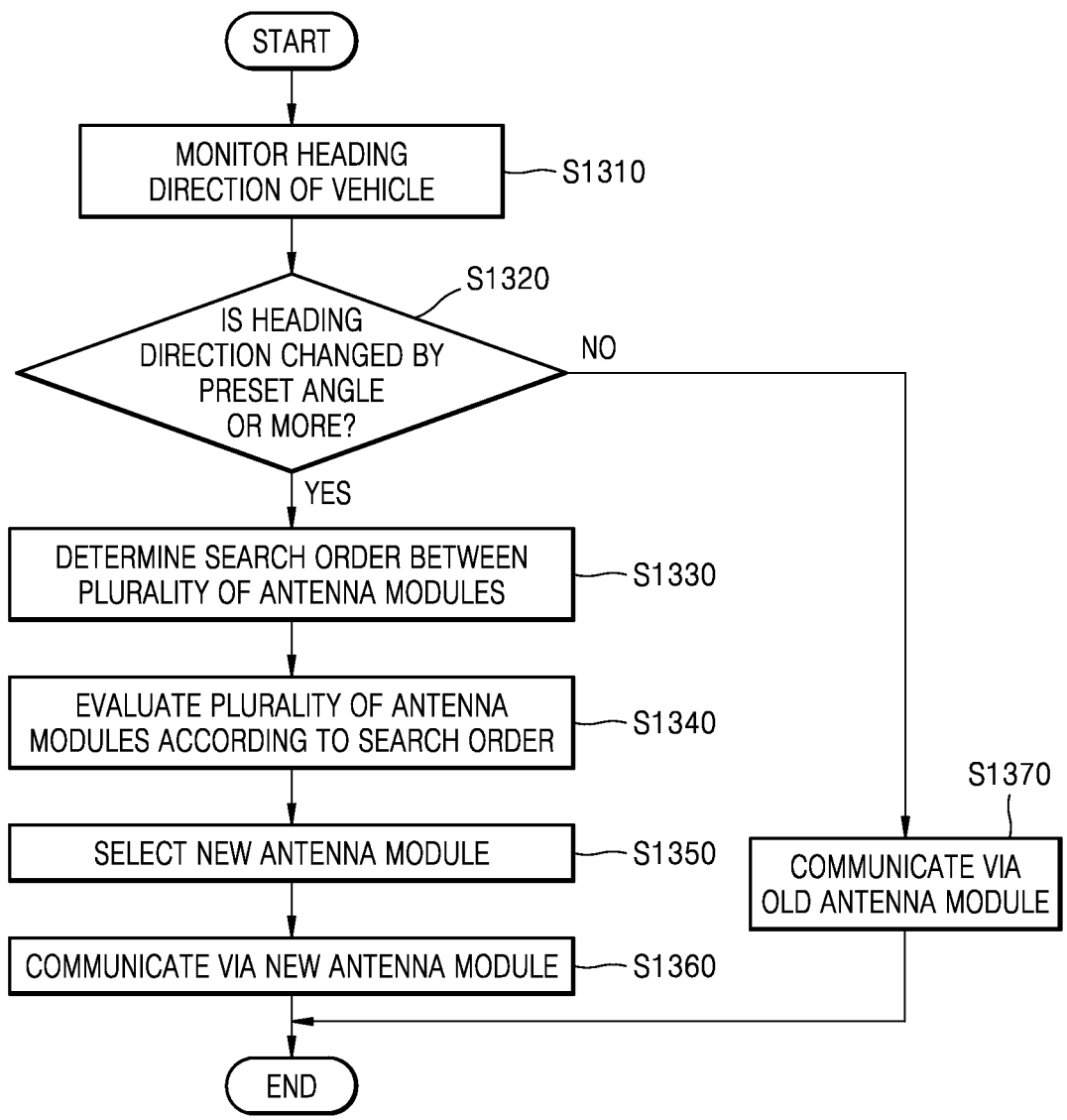
FIG. 13 is a flowchart illustrating a method of maintaining a communication link, according to an embodiment of the disclosure.

FIG. 13 is a flowchart illustrating a method of maintaining a communication link, according to an embodiment according to an embodiment of the disclosure.

Referring to FIG. 13, in operation S1310, the communication control device 200 may monitor the heading direction of the vehicle 20. The communication control device 200 may monitor the heading direction of the vehicle 20, based on at least one of an angle of a steering wheel, a navigation system, a GPS, or a gyro sensor.

In operation S1320, the communication control device 200 may determine whether the heading direction of the vehicle 20 is changed by as much as a preset angle or more.

In operation S1330, in a case in which the heading direction of the vehicle 20 may be changed by as much as the preset angle or more, the communication control device 200 determines a search order between the plurality of antenna modules 250 by considering the mounting positions of the plurality of antenna modules 250 mounted on the vehicle 20 and the changed heading direction of the vehicle 20.

In operation S1340, the communication control device 200 may evaluate the plurality of antenna modules 250 according to the search order. The communication control device 200 may evaluate the plurality of antenna modules 250 by comparing a quality index of a beam generated by an old antenna module with quality indices of beams respectively generated by the plurality of antenna modules 250.

In operation S1350, the communication control device 200 may select a new antenna module according to a result of evaluating the plurality of antenna modules 250.

The communication control device 200 may select, as the new antenna module, the antenna module 250 with a beam, which is identified earliest as being higher in quality index than the beam of the old antenna module.

In operation S1360, the communication control device 200 may communicate with the base station 10 by using the new antenna module.

In an embodiment, in a case in which a plurality of beams may be generated by each of the plurality of antenna modules 250, the communication control device 200 determines a search order between the plurality of beams by considering pointing directions of the plurality of beams and the heading direction of the vehicle 20. In addition, in a case in which evaluating one antenna module 250, the communication control device 200 may compare the quality index of the beam of the old antenna module with quality indices of the plurality of beams, according to the search order between the plurality of beams of the one antenna module 250.

In another embodiment, in a case in which the array antenna 256 of each of the plurality of antenna modules 250 operates while divided into a plurality of element groups, the communication control device 200 determines a search order between the plurality of element groups by considering positions of the element groups in the array antenna 256 and the heading direction of the vehicle 20. In addition, in a case in which evaluating the one antenna module 250, the communication control device 200 may compare the quality index of the beam of the old antenna module with the quality index of the beam generated by each element group, according to the search order between the plurality of element groups.

As described above, in a case in which determining the search order between the antenna modules 250, the search order between the beams, and/or the search order between the element groups, the communication control device 200 may further consider the location of the base station 10 and/or a location of an obstacle around the vehicle 20. Specifically, the communication control device 200 may select a first search object by considering the location of the base station 10 and/or the location of the obstacle around the vehicle 20. Alternatively, by considering the location of the base station 10 and/or the location of the obstacle around the vehicle 20, the communication control device 200 may exclude some of a plurality of antenna modules (or a plurality of beams or a plurality of element groups) and determine a search order between the remaining antenna modules (or the remaining beams or the remaining element groups).

In operation S1320, in a case in which the heading direction of the vehicle 20 is not changed by as much as the preset angle or more, the communication control device 200 communicates with the base station 10 by using the old antenna module in operation S1370.

Figure 14:
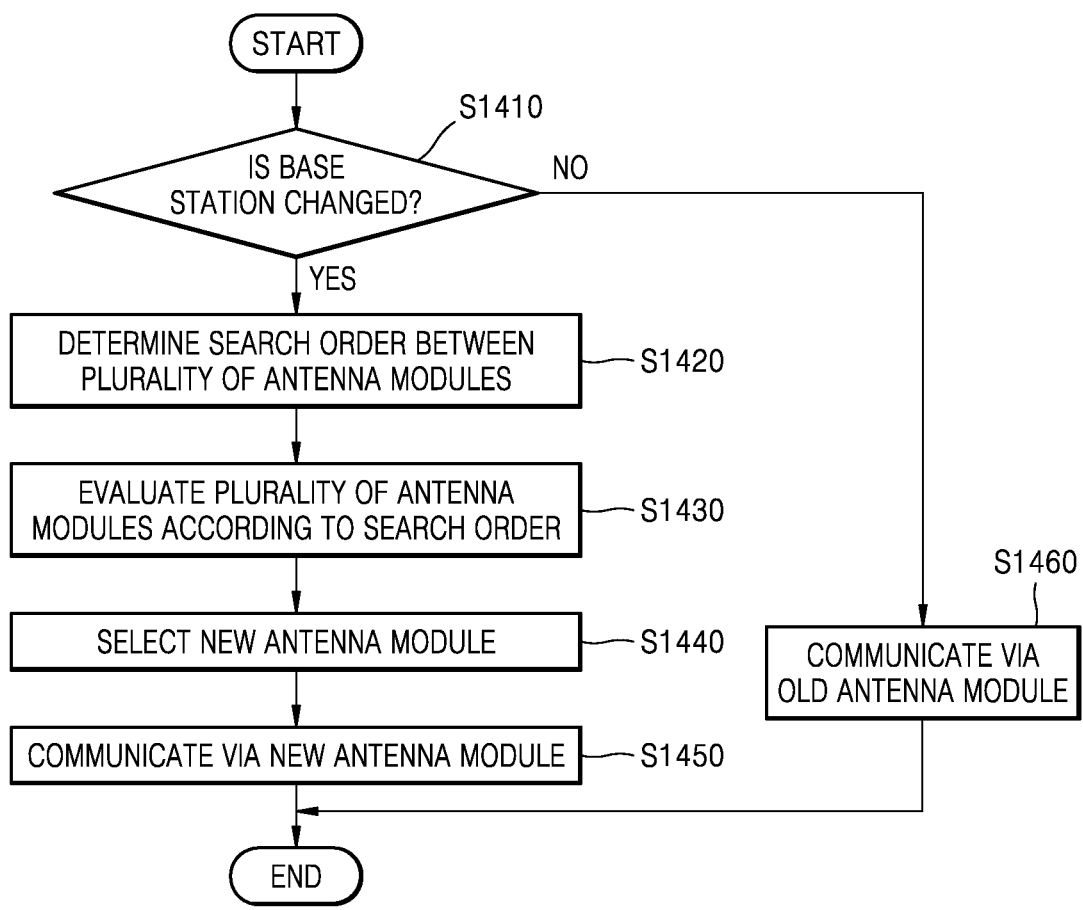
FIG. 14 is a flowchart illustrating a method of maintaining a communication link, according to an embodiment of the disclosure.

FIG. 14 is a flowchart illustrating a method of maintaining a communication link, according to an embodiment of the disclosure.

FIG. 14 may illustrate operations of the communication control device 200 in a case in which it is determined in operation S1320 that the heading direction of the vehicle 20 is not changed by as much as the preset angle or more.

Referring to FIG. 14, in operation S1410, the communication control device 200 determines whether there is a need for a base station change. In a case in which communication with a new base station instead of an old base station, which has been in communication, is anticipated to provide improved communication performance, the communication control device 200 may determine that the base station change is needed. In an embodiment, the communication control device 200 may determine whether there is a need for the base station change, according to handover conditions defined in 5G mobile communication standards.

In operation S1420, in a case in which the base station change is needed, the communication control device 200 determines the search order between the plurality of antenna modules 250.

In an embodiment, in a case in which determining the search order between the plurality of antenna modules 250, the communication control device 200 may consider a location of the new base station. Specifically, the communication control device 200 may exclude some antenna modules 250 by considering the location of the new base station and may determine a search order between the remaining antenna modules 250.

In an embodiment, the communication control device 200 may determine the search order between the plurality of antenna modules 250 to be a descending order of distances between the new base station and the plurality of antenna modules 250.

In a case in which a plurality of beams may be generated by each antenna module 250, the communication control device 200 may determine a search order between the plurality of beams by considering the location of the new base station. For example, a beam with a pointing direction, which is most similar to a direction where the new base station is located, from among the plurality of beams is selected to be a first search object, and a search direction for the remaining beams may be determined to be the CW or CCW direction. As another example, a beam, which is closest in the CW or CCW direction with respect to a beam used to communicate with the old base station, is selected to be the first search object, and the search direction for the remaining beams may be determined to be the CW or CCW direction.

In a case in which the array antenna 256 of each antenna module 250 operates while divided into a plurality of element groups, the communication control device 200 may determine a search order between the plurality of element groups by considering the location of the new base station. For example, an element group, which is closest to the new base station, from among the plurality of element groups is selected to be a first search object, and a search direction for the remaining element groups may be determined to be the CW or CCW direction. As another example, an element group, which is closest in the CW or CCW direction with respect to an element group used to communicate with the old base station, is selected to be the first search object, and the search direction for the remaining element groups may be determined to be the CW or CCW direction.

In operation S1430, the communication control device 200 evaluates the antenna modules 250 according to the search order therebetween, and in operation S1440, the communication control device 200 selects the new antenna module according to a result of the evaluation. In a case in which evaluating one antenna module 250, the communication control device 200 may evaluate a plurality of beams, which may be generated by the one antenna module 250, according to a search order between the plurality of beams, or may evaluate a plurality of element groups of the one antenna module 250 according to a search order between the plurality of element groups.

In operation S1450, the communication control device 200 communicates with the new base station by using the new antenna module. In a case in which a best beam or a best element group of the new antenna module is selected in operation S1440, the communication control device 200 may communicate with the new base station via the best beam of the new antenna module or via a beam generated by the best element group of the new antenna module.

In operation S1410, in a case in which the base station change is not needed, continue to communicate via the old antenna module in operation 1460.

In disclosed embodiments, at least one of the operations performed by the processor 230 may be performed by using artificial intelligence (AI) technology. The at least one operation performed by using AI technology is described below with reference to FIG. 15.

Figure 15:
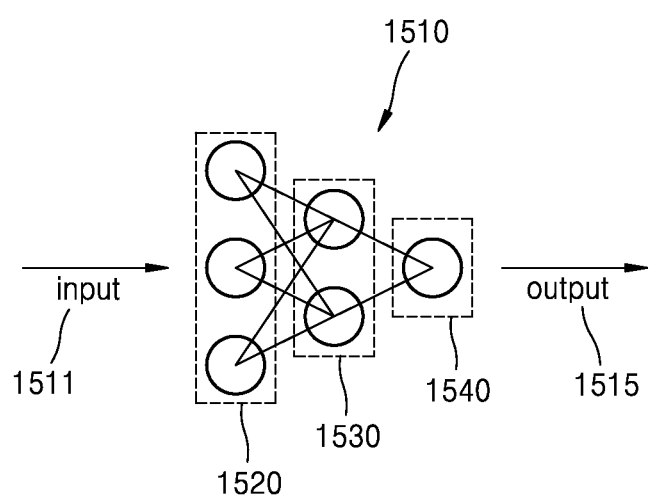
FIG. 15 is a diagram illustrating operations performed by using artificial intelligence technology, according to an embodiment of the disclosure.

FIG. 15 is a diagram illustrating operations performed by using AI technology according to an embodiment of the disclosure.

Specifically, at least one of i) determining a search order between antenna modules, ii) determining a search order between beams, iii) determining a search order between element groups, iv) selecting a new antenna module according to the search order, v) selecting a best beam according to the search order, or vi) selecting a best element group according to the search order, performed by the communication control device 200, may be performed by using AI technology for performing operations via a neural network. For example, the i) determining of the search order between the antenna modules may be performed on the basis of AI, based on mounting positions of the antenna modules and the heading direction of the vehicle 20.

AI technology refers to technology for obtaining an intended result by performing processing, such as analysis and/or classification, on input data, based on operations via a neural network.

Such AI technology may be implemented by using an algorithm. Here, an algorithm or a set of algorithms for implementing AI technology is referred to as a neural network. Here, the neural network may receive input data, perform an operation for the analysis and/or the classification, set forth above, and thus output result data. For the neural network to accurately output the result data corresponding to the input data, there is a need to train the neural network. As used herein, the term "training" may refer to training the neural network to allow the neural network to find or learn, by itself, a method of analyzing pieces of input data for the neural network, a method of classifying the pieces of input data, a method of extracting a feature, which is required to generate the result data, from the pieces of input data, and/or the like. Specifically, through the process of training, the neural network may optimize weight values in the neural network by performing training regarding training data (e.g., a plurality of images different from each other). In addition, by processing the input data via the neural network having the optimized weight values, the intended result is output.

When there are a plurality of hidden layers, which are layers for performing operations, inside the neural network, that is, when a depth of the neural network for performing operations is increased, the neural network may be classified as a deep neural network. Examples of the neural network include, but are not limited to, a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), a Deep Q-Network, and the like. In addition, the neural network may be subdivided. For example, the CNN may be subdivided into a Deep Convolution Neural Network (DCNN), a Capsnet (not shown), and the like.

The term "AI model" may refer to a neural network including at least one layer that operates to receive input data and output an intended result. In addition, the term "AI model" may refer to an algorithm or a set of algorithms for outputting an intended result by performing operations via the neural network, a processor for executing the algorithm (or the set of algorithms), software for executing the algorithm (or the set of algorithms), or hardware for executing the algorithm (or the set of algorithms).

At least one of the i) determining of the search order between the antenna modules, the ii) determining of the search order between the beams, the iii) determining of the search order between the element groups, the iv) selecting of the new antenna module according to the search order, the v) selecting of the best beam according to the search order, or the vi) selecting of the best element group according to the search order, described above, may be performed based on an AI model.

Referring to FIG. 15, a neural network 1510 may be trained by receiving training data that is input thereto. In addition, the trained neural network 1510 may receive input data 1511 input thereto through an input stage 1520, and the input stage 1520, a hidden layer 1530, and an output stage 1540 may perform operations for outputting output data 1515 by analyzing the input data 1511 and data transferred from a previous layer. Although FIG. 15 illustrates that the hidden layer 1530 includes one layer, this is only an example, and the hidden layer 1530 may include a plurality of layers.

In disclosed embodiments, the neural network 1510 may be trained regarding a search order allowing evaluation time of a plurality of antenna modules to be minimized, based on mounting positions of the antenna modules and the change angle of the heading direction of the vehicle 20. The neural network 1510 having been trained may receive the mounting positions of the antenna modules and the change angle of the heading direction of the vehicle 20 and determine the search order between the plurality of antenna modules.

In disclosed embodiments, the neural network 1510 may be trained regarding a search order allowing evaluation time of a plurality of beams to be minimized, based on pointing directions of the beams and the change angle of the heading direction of the vehicle 20. The neural network 1510 having been trained may receive the pointing directions of the beams and the change angle of the heading direction of the vehicle 20 and determine the search order between the plurality of beams.

In disclosed embodiments, the neural network 1510 may be trained regarding a search order allowing evaluation time of a plurality of element groups to be minimized, based on positions of the element groups in an array antenna and the change angle of the heading direction of the vehicle 20. The neural network 1510 having been trained may receive the positions of the element groups in the array antenna and the change angle of the heading direction of the vehicle 20 and determine the search order between the plurality of element groups.

In disclosed embodiments, a neural network for performing at least one of the i) determining of the search order between the antenna modules, the ii) determining of the search order between the beams, the iii) determining of the search order between the element groups, the iv) selecting of the new antenna module according to the search order, the v) selecting of the best beam according to the search order, or the vi) selecting of the best element group according to the search order, described above, may be implemented inside a processor (e.g., 230 in FIG. 2).

Alternatively, the neural network for performing at least one of the i) determining of the search order between the antenna modules, the ii) determining of the search order between the beams, the iii) determining of the search order between the element groups, the iv) selecting of the new antenna module according to the search order, the v) selecting of the best beam according to the search order, or the vi) selecting of the best element group according to the search order, described above, may be implemented inside an electronic device (not shown) or a processor (not shown) separate from the communication control device 200.

Operations via the neural network set forth above may also be performed by a server (not shown) that may communicate with the communication control device 200 according to an embodiment via a wireless communication network. The communication between the communication control device 200 and the server (not shown) is described with reference to FIGS. 16 and 17.

Figure 16:
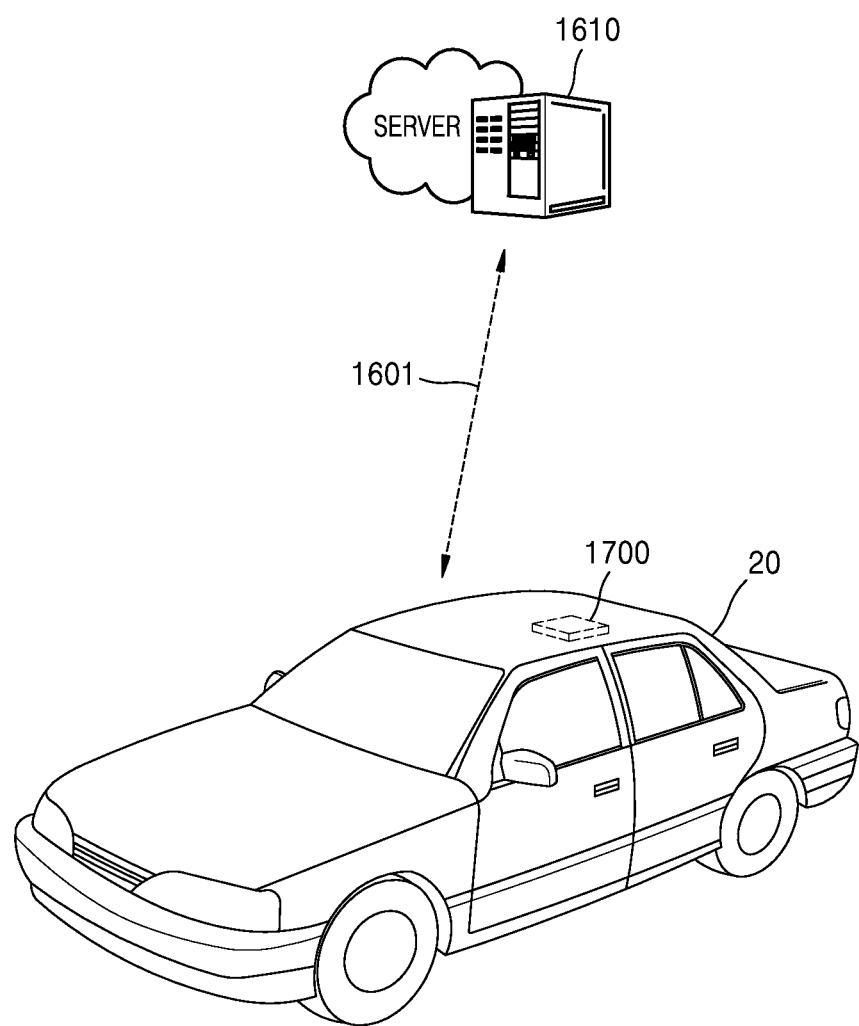
FIG. 16 is a diagram illustrating a communication control device operating in conjunction with a server according to an embodiment of the disclosure.

FIG. 16 is a diagram illustrating a communication control device according to disclosed embodiments, the communication control device operating in conjunction with a server according to an embodiment of the disclosure.

Figure 17:
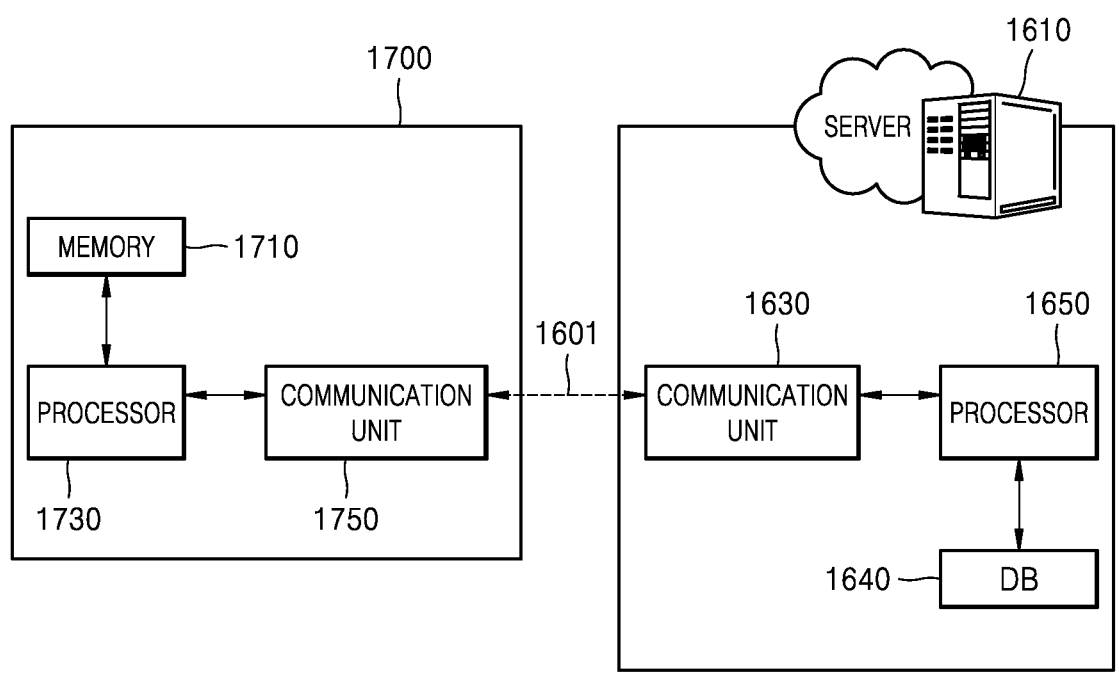
FIG. 17 is a diagram illustrating the example of FIG. 16 in detail according to an embodiment of the disclosure.

FIG. 17 is a diagram illustrating the example of FIG. 16 in detail according to an embodiment of the disclosure.

Referring to FIG. 16, in disclosed embodiments, a search order between a plurality of antenna modules, a search order between a plurality of beams, and/or a search order between a plurality of element groups may be calculated by a server 1610 and then transmitted to a communication control device 1700 located in the vehicle 20. The server 1610 may transmit data to and receive data from the communication control device 1700 via a communication network and may process data.

In an embodiment, an automotive electronic device may receive information about the search order between the antenna modules, the search order between the beams, and/or the search order between the element groups, and may transfer the received information to the communication control device 1700. In this case, the communication control device 1700 may evaluate the antenna modules, the beams, and/or the element groups according to the information received from the automotive electronic device.

Referring to FIG. 17, the server 1610 includes a communication unit 1630 for communicating with the communication control device 1700, and a processor 1650 for performing at least one instruction.

The processor 1650 of the server 1610 may receive information about mounting positions of the plurality of antenna modules, the heading direction of the vehicle 20, the location of the base station 10, a location of an obstacle around the vehicle 20, and the like, and may determine the search order between the antenna modules, the search order between the beams, and/or the search order between the element groups according to the received information. The communication unit 1630 may transmit, to the communication control device 1700, information indicating the search order between the antenna modules, the search order between the beams, and/or the search order between the element groups.

In disclosed embodiments, the server 1610 may determine the search order by performing operations via the neural network 1510 described with reference to FIG. 15. Specifically, the server 1610 may train an AI model and store the trained AI model. In addition, the server 1610 may determine the search order between the antenna modules, the search order between the beams, and/or the search order between the element groups by using the trained AI model.

In general, the communication control device 1700 may have a limit in a memory storage capacity, an operation processing speed, an ability to collect training datasets, or the like, as compared with the server 1610. Therefore, the server 1610 may perform operations requiring storage of a large amount of data and a large amount of operations, and then, may transmit data and/or an AI model, which is required, to the communication control device 1700 via the communication network. Then, even without a processor including large-capacity memory and having a fast operation ability, the communication control device 1700 may quickly and easily perform required operations by receiving and using the data and/or the AI model, which is required, from the server 1610.

In disclosed embodiments, the server 1610 may include the neural network 1510 described with reference to FIG. 15. Specifically, the neural network 1510 in the server 1610 may perform operations for determining the search order set forth above.

Referring to FIG. 17, the communication control device 1700 may further include a communication unit 1750, as compared with the communication control device 200 described with reference to FIG. 2. The communication control device 1700 may further include a memory 1710 and a processor 1730.

The communication unit 1750 performs communication with an external device (e.g., a server) via a wireless communication network 1601. Here, the external device (not shown) may perform at least one of operations required by the communication control device 1700 or may include a server (e.g., 1610) that may transmit data or the like required by the communication control device 1700.

The communication unit 1750 includes at least one communication module, such as a short-range communication module, a wired communication module, a mobile communication module, a broadcast receiving module, or the like. Here, the at least one communication module refers to tuners for performing broadcast reception, or communication modules that may perform data transmission and reception via a network conforming to communication specifications, such as Bluetooth, Wireless Local Area Network (WLAN) (Wi-Fi), Wireless broadband (Wibro), World Interoperability for Microwave Access (Wimax), Code Division Multiple Access (CDMA), Wireless CDMA (WCDMA), Internet, third generation (3G), fourth generation (4G), 5G, and/or communication schemes using millimeter waves (mm-Wave).

For example, when the communication unit 1750 performs communication by using mm Wave, the communication unit 1750 may quickly transmit and receive a large amount of data. Specifically, the vehicle 20 may quickly receive a large amount of data by using mmWave and may quickly provide data required for the safety of the vehicle 20 (e.g., data required for self-driving, data required for navigation services, or the like), content for use by users (e.g., movies, music, or the like), or the like, thereby improving the safety of the vehicle 20 and/or user convenience.

The mobile communication module in the communication unit 1750 may perform communication with another device (e.g., the server 1610), which is located at a long distance, via a communication network conforming to communication specifications, such as 3G, 4G, and/or 5G communication specifications. Here, a communication module for performing communication with another device located at a long distance may be referred to as a "long-range communication module".

Referring to FIG. 17, the server 1610 may include the communication unit 1630 and the processor 1650. In addition, the server 1610 may further include a database (DB) 1640.

The communication unit 1630 may include one or more components allowing communication with the communication control device 1700 to be performed. A particular configuration of the communication unit 1630 may identically correspond to the configuration of the communication unit 1750 described above, and thus, detailed descriptions thereof are omitted.

For example, the communication unit 1630 may include at least one communication module for performing communication with another device (e.g., the communication control device 1700), which is located at a long distance, via a communication network conforming to communication specifications, such as the Internet, 3G, 4G, and/or 5G communication specifications.

The processor 1650 controls overall operations of the server 1610. For example, the processor 1650 may perform required operations by executing at least one of the at least one instruction or programs of the server 1610.

The DB 1640 may include a memory (not shown) and may store, in the memory, at least one of the at least one instruction, the programs, or data, required for the server 1610 to perform a certain operation. In addition, the DB 1640 may store data required for the server 1610 to perform operations according to a neural network.

In disclosed embodiments, the server 1610 may store the neural network 1510 described with reference to FIG. 15. The neural network 1510 may be stored in at least one of the processors 1650 or the DB 1640. The neural network 1510 in the server 1610 may include a neural network having been trained.

In disclosed embodiments, the server 1610 may determine the search order described above, by using the neural network included therein, and may transmit the determined search order to the communication unit 1750 of the communication control device 1700 through the communication unit 1630.

In addition, the server 1610 may transmit the neural network, which has been trained, to the communication unit 1750 of the communication control device 1700 via the communication unit 1630. Then, the communication control device 1700 may obtain and store the neural network having been trained, and may obtain intended output data via the neural network.

The foregoing embodiments of the disclosure may be written in a program executable on a computer, and the written program may be stored in a medium.

The medium may persistently store a computer-executable program or may temporarily store the computer-executable program for execution or download. In addition, the medium may include various recording means or storage means in the form of a single piece of hardware or a combination of several pieces of hardware, is not limited to a medium directly connected to any computer system, and may be dispersed over a network. Examples of the medium may include a magnetic medium such as a hard disk, a floppy disk, and magnetic tape, an optical recording medium such as compact disc read only memory (CD-ROM) and digital versatile disc (DVD), a magneto-optical medium such as a floptical disk, and a medium configured to store program instructions therein by including ROM, random access memory (RAM), flash memory, or the like. In addition, other examples of the medium may include a recording medium or a storage medium, which is managed by an app store distributing applications, a site supplying or distributing other various software, a server, or the like.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method, performed by a communication control device, of establishing a communication link, the method comprising:
   monitoring a heading direction of a vehicle;
   in case that the heading direction of the vehicle is changed by at least as much as a preset angle, determining a search order between a plurality of antenna modules by considering the changed heading direction of the vehicle and mounting positions of the plurality of antenna modules mounted on the vehicle;
   evaluating the plurality of antenna modules according to the search order; and
   communicating with a base station via a new antenna module selected based on a result of the evaluating, rather than via an old antenna module used for communication with the base station.

2. The method of claim 1, wherein the evaluating of the plurality of antenna modules comprises comparing a quality index of a beam generated by each of the plurality of antenna modules with a quality index of a beam generated by the old antenna module.

3. The method of claim 1,
   wherein, in case that a plurality of beams are generable by each of the plurality of antenna modules,
   wherein the method further comprises determining a search order between the plurality of beams by considering the changed heading direction of the vehicle and pointing directions of the plurality of beams, and
   wherein the evaluating of the plurality of antenna modules comprises comparing a quality index of each of the plurality of beams with a quality index of a beam generated by the old antenna module, according to the search order between the plurality of beams.

4. The method of claim 3, wherein the determining of the search order between the plurality of beams comprises:
   selecting some of the plurality of beams by considering a location of the base station and pointing directions of the plurality of beams; and
   determining a search order between the selected beams.

5. The method of claim 1,
   wherein, in case that an array antenna of each of the plurality of antenna modules operates while divided into element groups, the method further comprises determining a search order between the element groups by considering the changed heading direction of the vehicle and positions of the element groups in the array antenna, and
   wherein the evaluating of the plurality of antenna modules comprises comparing a quality index of a beam generated by each of the element groups with a quality index of a beam generated by the old antenna module, according to the search order between the element groups.

6. The method of claim 1, wherein the determining of the search order between the plurality of antenna modules comprises:
   in case that the heading direction of the vehicle is changed in a clockwise direction, determining a search direction for the plurality of antenna modules to be a counterclockwise direction; and
   in case that the heading direction of the vehicle is changed in the counterclockwise direction, determining the search direction for the plurality of antenna modules to be the clockwise direction.

7. The method of claim 6, wherein the determining of the search order between the plurality of antenna modules comprises selecting, as a first search object, an antenna module adjacent to the old antenna module from among the plurality of antenna modules.

8. The method of claim 6, wherein the determining of the search order between the plurality of antenna modules comprises selecting a first search object from among the plurality of antenna modules by considering a location of the base station and a location of an obstacle around the vehicle.

9. The method of claim 1, wherein the heading direction of the vehicle is checked from at least one of a rotation angle of a steering wheel, a navigation system, a global positioning system (GPS), or a gyro sensor of the vehicle.

10. The method of claim 1, wherein the determining of the search order between the plurality of antenna modules comprises:

selecting some of the plurality of antenna modules by considering a location of the base station and mounting positions of the plurality of antenna modules mounted on the vehicle; and determining a search order between the selected antenna modules.

11. One or more non-transitory computer-readable storage media storing one or more computer programs for executing the method of claim 1 in combination with hardware.

12. A communication control device comprising:
at least one processor; and
a memory storing at least one instruction,
wherein the at least one processor is configured to execute the at least one instruction to:
monitor a heading direction of a vehicle,
in case that the heading direction of the vehicle is changed by at least as much as a preset angle, determine a search order between a plurality of antenna modules by considering the changed heading direction of the vehicle and mounting positions of the plurality of antenna modules mounted on the vehicle,
evaluate the plurality of antenna modules according to the search order, and
communicate with a base station via a new antenna module selected based on a result of the evaluation, rather than via an old antenna module used for communication with the base station.

13. The communication control device of claim 12, wherein the at least one processor is further configured to execute the at least one instruction to, for evaluating the plurality of antenna modules, compare a quality index of a beam generated by each of the plurality of antenna modules with a quality index of a beam generated by the old antenna module.

14. The communication control device of claim 13, wherein the at least one processor is further configured to execute the at least one instruction to select, as the new antenna module, an antenna module with a beam, which is identified earliest as being higher in quality index than the beam generated by the old antenna module, from among the plurality of antenna modules.

15. The communication control device of claim 13, wherein the at least one processor is further configured to execute the at least one instruction to:
in case that a plurality of beams are generable by each of the plurality of antenna modules, determine a search order between the plurality of beams by considering the changed heading direction of the vehicle and pointing directions of the plurality of beams; and
for evaluating the plurality of antenna modules, compare a quality index of each of the plurality of beams with the quality index of the beam generated by the old antenna module, according to the search order between the plurality of beams.

16. The communication control device of claim 13, wherein the at least one processor is further configured to execute the at least one instruction to, when evaluating one antenna module, compare the quality index of the beam of the old antenna module with quality indices of a plurality of beams, according to the search order between the plurality of beams of the one antenna module.

17. The communication control device of claim 16, wherein the at least one processor is further configured to determine the search order between the plurality of antenna modules, a search order between the plurality of beams, and a search order between a plurality of element groups by consideration of at least one of a location of the base station or a location of an obstacle around the vehicle.

18. The communication control device of claim 17, wherein the at least one processor is further configured to:
exclude at least one of a portion of the plurality of antenna modules, a portion of the plurality of beams, or a portion of the plurality of element groups, and
determine a search order between at least one of remaining antenna modules, remaining beams, or remaining element groups.

\* \* \* \* \*